(12) United States Patent
Bracke et al.

(10) Patent No.: US 12,506,489 B2
(45) Date of Patent: Dec. 23, 2025

(54) TECHNIQUES FOR REDUCED NOISE CAPACITANCE-TO-VOLTAGE CONVERTER

(71) Applicant: INVENSENSE, INC., San Jose, CA (US)

(72) Inventors: Wouter Bracke, Heverlee (BE); Bert Serneels, Heverlee (BE); Athanasios Sarafianos, Landen (BE); Tim Piessens, Bornem (BE)

(73) Assignee: INVENSENSE, INC., San Jose, CA (US)

( * ) Notice: Subject to any disclaimer, the term of this patent is extended or adjusted under 35 U.S.C. 154(b) by 232 days.

(21) Appl. No.: 18/500,886

(22) Filed: Nov. 2, 2023

(65) Prior Publication Data
US 2024/0171188 A1     May 23, 2024

Related U.S. Application Data

(60) Provisional application No. 63/427,017, filed on Nov. 21, 2022.

(51) Int. Cl.
*H03M 1/08* (2006.01)
*G01D 5/24* (2006.01)
(Continued)

(52) U.S. Cl.
CPC ............ *H03M 1/0827* (2013.01); *G01D 5/24* (2013.01); *G01R 19/0053* (2013.01); *G01R 19/257* (2013.01); *G01R 19/0023* (2013.01)

(58) Field of Classification Search
CPC ........ G01R 27/00; G01R 27/02; G01R 27/26; G01R 27/2605; G01R 17/00; G01R 17/10; G01R 17/105; G01R 19/00; G01R 19/0023; G01R 19/0046; G01R 19/0053; G01R 19/25; G01R 19/257; G01D 5/00; (Continued)

(56) References Cited

U.S. PATENT DOCUMENTS 5,706,027 A * 1/1998 Hilton ..................... B25J 13/085
                                                        345/161
5,798,748 A * 8/1998 Hilton ................... G06F 3/0338
                                                        345/166

(Continued)

*Primary Examiner* — Hoai-An D. Nguyen
(74) *Attorney, Agent, or Firm* — Amin, Turocy & Watson, LLP

(57) ABSTRACT

A continuous time single drive capacitance-to-voltage (C2V) converter can be employed for single sensor, balanced single sensor, or differential sensor. First sensor and/or second sensor can be employed to sense a condition. A capacitive bridge can comprise a first capacitive digital-to-analog-converter (DAC) and second capacitive DAC as a differential node. First capacitive DAC can be associated with first sensor, and second capacitive DAC can be associated with a third capacitive DAC, in series with first sensor, if single sensor is implemented or the second sensor if balanced single sensor or differential sensor is implemented. Capacitive bridge can be connected to differential input of a capacitive feedback amplifier that can be a continuous time amplifier with no signal sampling and no noise folding. Capacitive feedback amplifier can comprise capacitively coupled input common mode feedback, which can remove noise from a sensor drive, and output common mode feedback.

26 Claims, 8 Drawing Sheets

(51) Int. Cl.
*G01R 19/00* (2006.01)
*G01R 19/257* (2006.01)

(58) Field of Classification Search
CPC .. G01D 5/12; G01D 5/14; G01D 5/24; H03M 1/00; H03M 1/06; H03M 1/08; H03M 1/0827; H03M 1/12; H03M 1/14; H03M 1/145; H03M 1/66
USPC ................................. 324/600, 602, 605, 607
See application file for complete search history.

(56) References Cited

U.S. PATENT DOCUMENTS

| | | | |
|---|---|---|---|
| 6,331,780 B1* | 12/2001 | Hiroshima | G01R 27/2605 324/683 |
| 10,803,277 B2* | 10/2020 | Wu | H03F 3/45932 |
| 2018/0074101 A1* | 3/2018 | Wu | G01R 27/2605 |
| 2022/0385296 A1* | 12/2022 | Ye | H03M 1/1295 |

* cited by examiner

TECHNIQUES FOR REDUCED NOISE CAPACITANCE-TO-VOLTAGE CONVERTER

CROSS-REFERENCE TO RELATED APPLICATION

This application claims priority to U.S. Provisional Patent Application Ser. No. 63/427,017, filed on Nov. 21, 2022, and entitled "Single Drive Capacitance To Voltage (C2V) Converter," the entirety of which application is hereby incorporated by reference herein.

TECHNICAL FIELD

The subject disclosure relates generally to sensor technology, e.g., techniques for a reduced noise capacitance-to-voltage converter.

BACKGROUND

A capacitance-to-voltage (C2V) converter can be employed in electronic devices to convert a capacitance value of, for example, a capacitive sensor, to a voltage level that can correspond to or can be representative of the capacitance value. A C2V converter can be employed with various types of sensors, such as, for example, a single sensor, a balanced single sensor, or a differential sensor. A single sensor or balanced single sensor can be, for example, a pressure sensor that can sense air pressure or other type of pressure (e.g., touch pressure from the sensor being touched or pressed by a finger or other object). A differential sensor can be, for example, an accelerometer that can sense acceleration or motion of an object.

The above-described description is merely intended to provide a contextual overview relating to sensor and C2V converter technologies, and is not intended to be exhaustive.

SUMMARY

The following presents a simplified summary of various aspects of the disclosed subject matter in order to provide a basic understanding of some aspects described herein. This summary is not an extensive overview of the disclosed subject matter. It is intended to neither identify key or critical elements of the disclosed subject matter nor delineate the scope of such aspects. Its sole purpose is to present some concepts of the disclosed subject matter in a simplified form as a prelude to the more detailed description that is presented later.

In some embodiments, the disclosed subject matter can comprise a system that can comprise a sensor component that can sense a condition. The system also can include a first capacitive digital-to-analog-converter component that can be connected in series with the sensor component, and can facilitate removal of a base capacitance value of a capacitance of the sensor component, wherein the sensor component and the first capacitive digital-to-analog-converter component can be driven by a reference voltage signal that can be received from a sensor drive component. The system further can comprise a capacitive bridge component that can comprise a second capacitive digital-to-analog-converter component and a third capacitive digital-to-analog-converter component as a differential node, wherein the second capacitive digital-to-analog-converter component can be connected to the sensor component, and the third capacitive digital-to-analog-converter component can be connected to the first capacitive digital-to-analog-converter component.

In certain embodiments, the disclosed subject matter can comprise a device comprising a first sensor component and a second sensor component that sense a condition. The device also can comprise a capacitive bridge component that can comprise a first capacitive digital-to-analog-converter component and a second capacitive digital-to-analog-converter component that can constitute a differential node, wherein the first capacitive digital-to-analog-converter component can be connected to the first sensor component, and the second capacitive digital-to-analog-converter component can be connected to the second capacitive digital-to-analog-converter component, and wherein at least the first sensor component can be driven by a reference voltage signal received from a sensor drive component.

In some embodiments, the disclosed subject matter can comprise a system that can comprise at least one of a first sensor component or a second sensor component that can sense a condition, wherein at least the first sensor component can be driven by a reference voltage signal that can be received from a sensor drive component. The system also can include a capacitive bridge component that can comprise a first capacitive digital-to-analog-converter component and a second capacitive digital-to-analog-converter component as a differential node, wherein the first capacitive digital-to-analog-converter component can be associated with the first sensor component, and wherein the second capacitive digital-to-analog-converter component can be associated with the second sensor component or a third capacitive digital-to-analog-converter component.

The following description and the annexed drawings set forth in detail certain illustrative aspects of the disclosed subject matter. These aspects are indicative, however, of but a few of the various ways in which the principles of the disclosed subject matter may be employed, and the disclosed subject matter is intended to include all such aspects and their equivalents. Other advantages and distinctive features of the disclosed subject matter will become apparent from the following detailed description of the disclosed subject matter when considered in conjunction with the drawings.

DETAILED DESCRIPTION

Figure 1:
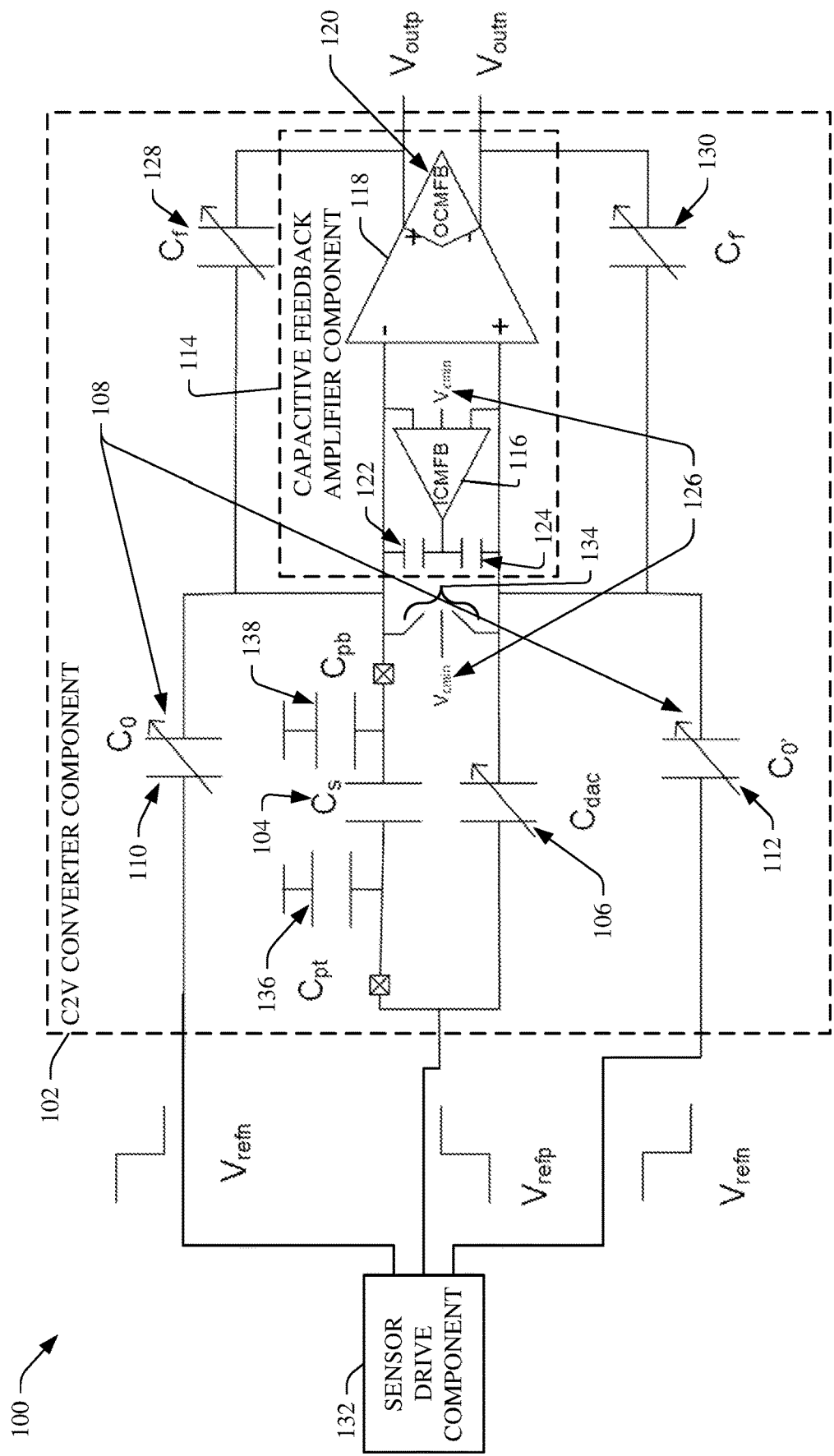
FIG. 1 illustrates a diagram of an example system that can comprise a capacitance-to-voltage (C2V) converter component, comprising a single sensor component, in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

A capacitance-to-voltage (C2V) converter can be employed in electronic devices to convert a capacitance value of, for example, a capacitive sensor, to a voltage level that can correspond to or can be representative of the capacitance value. A C2V converter can be employed with various types of sensors, such as, for example, a single sensor, a balanced single sensor, or a differential sensor.

A C2V converter (e.g., a first stage C2V converter), when employed in a first stage of a signal chain of an electronic circuit, can be a significant part of the signal conditioning for addressing amplification of the signal. It can be desirable (e.g., wanted or needed) to have such signal conditioning and amplification of the signal to be low noise with good suppression of interfering radio frequency (RF) fields and rejection of parasitic capacitances of the sensor element. When the C2V converter is utilized in the first stage of the signal chain, the signal typically have a low level (e.g., low voltage level), so any noise or interference can significantly and undesirably degrade the signal. It also can be desirable to have C2V converters consume low power and current, particularly when the C2V converter is being utilized for a low power application.

Some existing C2V converters can be dual drive C2V converters that can apply one reference voltage signal to a capacitive sensor element and a different reference voltage signal to another capacitive element, connected to the capacitive sensor element. Such existing dual drive C2V converters can have undesirably high noise associated with the sensor drive voltage, can have undesirably low power supply rejection ratio (PSRR) towards the sensor drive, and can have undesirably high rectification effects from RF components associated with the sensor drive, among other deficiencies. Such existing dual drive C2V converters also can utilize an undesirably high amount of power and current.

Certain existing C2V converters can employ a sampling amplifier that can sample the signal. Such existing C2V converters, employing a sampling amplifier, can have an undesirably high amount of noise due in part to noise folding that can result from the signal sampling by the sampling amplifier. Such existing C2V converters also can utilize an undesirably high amount of power and current.

To overcome the various issues and deficiencies of existing systems, methods, and techniques, the disclosed subject matter can employ techniques, systems, devices, and methods that can comprise or form desirable (e.g., suitable, efficient, enhanced, and/or optimal) continuous time single drive C2V converters that can be implemented with a single sensor component, a balanced single sensor component, and/or a differential sensor component. A system or device can comprise a continuous time single drive C2V converter component that can comprise a first sensor component (e.g., a first capacitive sensor component) and/or second sensor component (e.g., a second capacitive sensor component) that can sense a condition (e.g., pressure, motion, or other type of condition). In the single sensor component implementation, the C2V converter component can comprise the first sensor component. In the balanced single sensor component or differential sensor component implementations, the C2V converter component can comprise the first sensor component and second sensor component. In some embodiments, the C2V converter component can be utilized in a first stage of the signal chain of the system or device to facilitate desirable signal conditioning for addressing amplification of a signal at low noise with desirably good suppression of interfering radio frequency (RF) fields and rejection of parasitic capacitances of the sensor component(s) and/or other noise associated with the system or device (e.g., the sensor component(s), a sensor drive component, and/or other component of the system or device).

With regard to the single sensor component implementation, the first sensor component can be connected in series to a capacitive DAC component. The capacitive DAC can facilitate removal of a base capacitance value of a capacitance of the first sensor component. The C2V converter component also can comprise a capacitive bridge component that can be associated with the first sensor component and the capacitive DAC component. The capacitive bridge component can comprise a first capacitive DAC component and a second capacitive DAC component as a differential node, wherein the first capacitive DAC component can be associated with (e.g., connected to) the first sensor component, and the second capacitive DAC component can be associated with the first capacitive DAC component. The capacitive DAC component connected in series to the first sensor component can be considered or referred to as a third capacitive DAC component.

In some embodiments, the first sensor component and the third DAC component can be driven by a first reference voltage signal (e.g., $V_{refp}$) that can be received from a sensor drive component. The capacitive bridge component can be driven by a second reference voltage signal (e.g., $V_{refn}$) that can be received from the sensor drive component.

In certain embodiments, the C2V converter component can comprise a capacitive feedback amplifier component. The capacitive bridge component can be connected to a differential input of the capacitive feedback amplifier component. The capacitive feedback amplifier component can comprise an amplifier component, capacitively coupled input common mode feedback component (ICMFB) at the input, and output common mode feedback component (OCMFB) at its output. The ICMFB (e.g., capacitively coupled ICMFB amplifier component) can be at the input of the capacitive feedback amplifier component and can be associated with (e.g., connected to) the differential input of the amplifier component, and the OCMFB can be associated with the output of the amplifier component and can be the output of the capacitive feedback amplifier component. The capacitive feedback amplifier component, with the OCMFB, can generate a common mode voltage signal (which can be a differential voltage signal) as an output based at least in part on the capacitance of the first sensor component input to the capacitive feedback amplifier component, wherein the capacitance of the first sensor component can be based at least in part on (e.g., can correspond to or be a function of) a value (e.g., a sensed or measured value) of the sensed condition. The common mode voltage signal can be fed back to the ICMFB and the capacitive bridge component via feedback capacitors that, respectively, at one end, can be associated with the OCMFB output (which can be a differential output) of the capacitive feedback amplifier component, and, at their other end, can be associated with the differential input of the capacitive feedback amplifier component and the capacitor bridge component. In some embodiments, the capacitive feedback amplifier component can be a continuous time AFE amplifier with no signal sampling and no noise folding, or at least substantially no noise folding.

With regard to the balanced single sensor component implementation, the C2V converter component can comprise the balanced single sensor component, wherein the balanced single sensor component can comprise the first sensor component and the second sensor component. The first sensor component and the second sensor component can be the same or at least substantially the same, and together can form the balanced single sensor component on a same sensor die. In some embodiments, the first sensor component and the second sensor component can be half or approximately half of the size of a single sensor.

The C2V converter component of the balanced single sensor component implementation also can comprise the capacitive bridge component that can be associated with the balanced single sensor component. For instance, the first capacitive DAC component of the capacitive bridge component can be associated with (e.g., connected to) the first sensor component, and the second capacitive DAC component of the capacitive bridge component can be associated with the second capacitive DAC component. The first sensor component and the second capacitive DAC component can be driven by the first reference voltage signal that can be received from the sensor drive component. The second sensor component and the first capacitive DAC component can be driven by the second reference voltage signal that can be received from the sensor drive component.

The C2V converter component for the balanced single sensor component implementation can include the capacitive feedback amplifier component. The capacitive bridge component can be connected to the differential input of the capacitive feedback amplifier component, wherein the capacitive feedback amplifier component can comprise the capacitively coupled ICMFB, the amplifier component, and the OCMFB, such as described herein. The capacitive feedback amplifier component, with the OCMFB, can generate a common mode voltage signal as an output based at least in part on the capacitance of the balanced single sensor component input to the capacitive feedback amplifier component. The common mode voltage signal can be fed back to the ICMFB and the capacitive bridge component via the feedback capacitors that, respectively, at one end, can be associated with the OCMFB output of the capacitive feedback amplifier component, and, at their other end, can be associated with the differential input of the capacitive feedback amplifier component and the capacitor bridge component.

With regard to the differential sensor component implementation, the C2V converter component can comprise the differential sensor component, wherein the differential sensor component can comprise the first sensor component and the second sensor component. In some embodiments, the first sensor component can be connected in series with the second sensor component to form the differential sensor component.

The C2V converter component of the differential sensor component implementation also can comprise the capacitive bridge component that can be associated with the differential sensor component. For instance, the first capacitive DAC component of the capacitive bridge component can be associated with (e.g., connected to) the first sensor component, and the second capacitive DAC component of the capacitive bridge component can be associated with the second capacitive DAC component. The first sensor component and the second sensor component can be driven by the first reference voltage signal that can be received from the sensor drive component. The first capacitive DAC component and the second capacitive DAC component can be driven by the second reference voltage signal that can be received from the sensor drive component.

The C2V converter component of the differential sensor component implementation can include the capacitive feedback amplifier component. The capacitive bridge component can be connected to the differential input of the capacitive feedback amplifier component, wherein the capacitive feedback amplifier component can comprise the capacitively coupled ICMFB, the amplifier component, and the OCMFB, such as described herein. The capacitive feedback amplifier component, with the OCMFB, can generate a common mode voltage signal as an output based at least in part on the capacitance of the differential sensor component input to the capacitive feedback amplifier component. The common mode voltage signal can be fed back to the ICMFB and the capacitive bridge component via the feedback capacitors that, respectively, at one end, can be associated with the OCMFB output of the capacitive feedback amplifier component, and, at their other end, can be associated with the differential input of the capacitive feedback amplifier component and the capacitor bridge component.

The C2V converter components and associated techniques of the disclosed subject matter can desirably (e.g., suitably, efficiently, enhancedly, and/or optimally) suppress, reduce, or reject, or facilitate suppression, reduction, or rejection of noise, RF field interference, electromagnetic interference (EMI), noise or other interference associated with parasitic capacitances (e.g., associated with the sensor component(s)), and/or other noise or interference, as compared to existing C2V converter components and associated techniques. The C2V converter components and associated techniques of the disclosed subject matter also desirably can have continuous time analog front end (AFE), which can result in no noise folding, or at least substantially no noise folding, which can reduce the amount of noise associated with the system or device comprising such C2V converter component, as compared to existing C2V converter components and associated techniques. In some embodiments, the C2V converter components and associated techniques of the disclosed subject matter can desirably employ a single drive topology that can reduce or reject noise associated with the system or device comprising such C2V converter component, where undesired noise and/or disturbances (e.g., on the sensor drive component) can be transferred to the common mode, which can result in a desirably good common mode noise and/or disturbance rejection, as compared to existing C2V converter components and associated techniques. The C2V converter components and associated techniques of the disclosed subject matter further can desirably increase a PSRR towards the sensor drive component and can provide a desirably good PSRR of such C2V converter component, as compared to existing C2V converter components and associated techniques. The C2V converter components and associated techniques of the disclosed subject matter also can desirably have an enhanced (e.g., better, improved, or increased) power (and/or current)-noise tradeoff, as such C2V converter components and associated techniques can significantly reduce (e.g., by three times, five times, or more) the amount of power consumption in relation to a noise budget, as compared to existing C2V converter components and associated techniques. This can be due in part to the elimination, or at least substantial elimination, of noise folding and the removal, or at least significant removal, of sensor drive noise by the ICMFB of the C2V converter components and associated techniques of the disclosed subject matter.

These and other aspects of the disclosed subject matter are described with regard to the figures.

Turning to FIG. 1, illustrated is a diagram of an example system 100 that can comprise a C2V converter component, comprising a single sensor component, in accordance with various aspects and embodiments of the disclosed subject matter. The system 100 can comprise, or can be used in connection with, a pressure sensor (e.g., an air pressure sensor, a touch pressure sensor, or other type of pressure sensor), a single sensor, a capacitive sensor, a capacitive antenna, and/or other types of sensors, components, or devices. In some implementations, the system 100 can be, can comprise, or can be used in connection with a MEMS or semiconductor sensor.

The system 100 can be or can comprise a C2V converter component 102 that can convert a capacitance value (e.g., capacitance amount or level) to a voltage signal having a voltage level that can correspond to the capacitance value. In some embodiments, the C2V converter component 102 can be a continuous time single drive C2V converter. In certain embodiments, the C2V converter component 102 can be utilized in a first stage of a signal chain of the system 100 or associated device to facilitate desirable (e.g., suitable, enhanced, or optimal) signal conditioning for addressing amplification of a signal at low noise with desirably good suppression of interfering RF fields and rejection of parasitic capacitances of the sensor component(s) and/or other noise associated with the system 100 or associated device (e.g., noise associated with the sensor component(s), a sensor drive component, and/or other component of or associated with the system 100).

The C2V converter component 102 can comprise a sensor component 104 (e.g., a capacitive sensor component ($C_s$)) and a capacitive DAC component 106 ($C_{dac}$) that can be connected in series with the sensor component 104 in the C2V converter circuit. In accordance with various embodiments, the C2V converter component 102, the sensor component 104, and/or another component(s) of the system 100 can be MEMS components that can be formed using MEMS technology. In certain embodiments, the capacitive DAC component 106 desirably can be utilized to remove or facilitate removal of a base capacitance value of the sensor component 104. For instance, the capacitive DAC component 106 can be programmed, adjusted (e.g., modified), or set to a desired capacitance value that can facilitate removing, or at least substantially removing, the base capacitance value of the sensor component 104.

The C2V converter component 102 also desirably can comprise a capacitive bridge component 108 that can be associated with (e.g., electrically or logically connected to) the sensor component 104 and the capacitive DAC component 106. The capacitive bridge component 108 can comprise a first capacitive DAC component 110 (e.g., $C_0$) and a second capacitive DAC component 112 (e.g., $C_{0'}$). The first capacitive DAC component 110 and second capacitive DAC component 112 can create a differential node (e.g., a "dummy" differential node) to form the capacitive bridge. It is noted that the capacitive DAC component 106 also can be referred to herein as a third capacitive DAC component 106. The sensor component 104 can be associated with the first capacitive DAC component 110 (e.g., one end (e.g., port, terminal, or plate) of the first capacitive DAC component 110 can be connected to an end of the sensor component 104 at a first node of the differential node), and the third capacitive DAC component 106 can be associated with the second capacitive DAC component 112 (e.g., one end (e.g., port, terminal, or plate) of the second capacitive DAC component 112 can be connected to an end of the third capacitive DAC component 106 at a second node of the differential node).

The C2V converter component 102 can comprise, and the capacitive bridge component 108 can be associated with (e.g., electrically or logically connected to), a capacitive feedback amplifier component 114. The capacitive feedback amplifier component 114 can comprise an input common mode feedback component (ICMFB) 116 (e.g., an ICMFB circuit, which can be or can comprise an ICMFB amplifier component), an amplifier component 118 (e.g., main amplifier or charge amplifier), and an output common mode feedback component (OCMFB) 120 (e.g., an OCMFB circuit) at or associated with the output (e.g., a common mode output, which can be a differential output) of the capacitive feedback amplifier component 114, such as described herein. In some embodiments, the capacitive bridge component 108 (e.g., the differential node associated with the capacitive bridge component 108) can be connected to a differential input of the amplifier component 118 and inputs of the ICMFB 116. For instance, the first capacitive DAC component 110 (and the sensor component 104) can be connected to the negative (−) input of the amplifier component 118 and one of the inputs of the ICMFB 116, and the second capacitive DAC component 112 (and the third capacitive DAC component 106) can be connected to the positive (+) input of the amplifier component 118 and the other input of the ICMFB 116.

In some embodiments, the ICMFB 116 can be a capacitively coupled ICMFB. To facilitate the capacitive coupling, the C2V converter component 102 can comprise a capacitor component 122 and a capacitor component 124. One end of the capacitor component 122 can be connected to the negative input of the amplifier component 118, the one input of the ICMFB 116, the first capacitive DAC component 110, and the sensor component 104, and the other end of the capacitor component 122 can be connected to an output of the capacitively coupled ICMFB 116. Also, one end of the capacitor component 124 can be connected to the positive input of the amplifier component 118, the other input of the ICMFB 116, the second capacitive DAC component 112, and the first capacitive DAC component 110, and the other end of the capacitor component 124 can be connected to the output of the capacitively coupled ICMFB 116. Accordingly, the output from the ICMFB 116 (e.g., an output voltage signal output from the output port of the ICMFB amplifier component) can be capacitively coupled towards the negative (−) input and the positive (+) input of the amplifier component 118. The capacitor component 122 and capacitor component 124 can be relatively small in capacitance as compared to other capacitive components (e.g., capacitive sensor component 104, and/or capacitive DAC components) of the system 100.

In certain embodiments, the capacitively coupled ICMFB 116 (e.g., the capacitively coupled ICMFB amplifier component) can receive a defined voltage level (e.g., $V_{cmin}$) from a voltage source component 126 that can generate and/or supply a voltage at the defined voltage level. In some embodiments, the defined voltage level (e.g., $V_{cmin}$) can be a reference voltage that can be set as a function of a first reference voltage signal (e.g., $V_{refp}$) and a second reference voltage signal (e.g., $V_{refn}$) that can be associated with the C2V converter component 102, such as described herein. For example, the defined voltage level (e.g., $V_{cmin}$) can be a reference voltage that can be set or programmed as $$\left(\frac{V_{refp} + V_{refn}}{2}\right).$$

The input common mode feedback loop associated with the capacitively coupled ICMFB 116 can operate, at least in part, as follows. The difference between the reference voltage (e.g., $V_{cmin}$) and the voltage level of the common mode component of the positive (+) input and the negative (−) input of the amplifier component 118 can be amplified by the ICMFB 116 (e.g., the ICMFB amplifier component) based at least in part on a gain level of the ICMFB 116. As disclosed, the output from the ICMFB 116 (e.g., the output voltage signal output from the output port of the ICMFB amplifier component) can be capacitively coupled towards the negative (−) input and the positive (+) input of the amplifier component 118. In this way, the common mode component of the input of the amplifier component 118 can be regulated towards the reference voltage (e.g., $V_{cmin}$) by or as facilitated by the capacitively coupled ICMFB 116. For instance, the voltage level of the common mode component at the negative (−) input and/or the positive (+) input of the amplifier component 118 can desirably be controlled to be or remain at or substantially close to the reference voltage (e.g., $V_{cmin}$), as regulated using the capacitively coupled ICMFB 116.

In some embodiments, for this gain stage involving the capacitive feedback amplifier component 114, the capacitive feedback amplifier component 114 (e.g., each of the amplifier component 118 and/or the ICMFB 116) can have a programmable, settable, or adjustable gain setting to facilitate setting the gain of the capacitive feedback amplifier component 114 to a desired gain level that can be, for example, 1.0 or greater than 1.0. The capacitive feedback amplifier component 114 desirably can employ no sampling of the signal of the sensor component 104. Since no sampling of the signal is being performed, the capacitive feedback amplifier component 114 can be a continuous amplifier (e.g., a continuous time AFE amplifier), and accordingly and desirably, there can be no fold back noise or at least substantially no noise folding (e.g., noise is not folded back from high frequency to lower frequency due to aliasing, which can result from sampling of the signal).

In certain embodiments, the capacitive feedback amplifier component 114 also can have a common mode output (e.g., $V_{outp}$ and $V_{outn}$), which also can be the common mode output of the C2V converter component 102 (as well as a differential output of the C2V converter component 102). For instance, as disclosed, the capacitive feedback amplifier component 114 can comprise the OCMFB 120 (e.g., an OCMFB circuit) at or associated with the output of the amplifier component 118 of the capacitive feedback amplifier component 114. The capacitive feedback amplifier component 114, with the OCMFB 120, can generate a common mode voltage signal (e.g., $V_{outp}$-$V_{outn}$) as an output based at least in part on the capacitance of the sensor component 104 that can be input to the capacitive feedback amplifier component 114, the gain level of the amplifier component 118, and/or the gain level of the ICMFB 116 (e.g., ICMFB amplifier component), wherein the capacitance of the sensor component 104 can be based at least in part on (e.g., can correspond to or be a function of) a value (e.g., a sensed or measured value) of the condition sensed by the sensor component 104.

The common mode voltage signal at the output of the OCMFB 120 desirably can be fed back to the ICMFB 116, the differential input of the amplifier component 118, and the capacitive bridge component 108 via a feedback capacitor ($C_f$) 128 and a feedback capacitor ($C_f$) 130 that, respectively, at one end, can be associated with the common mode output of the capacitive feedback amplifier component 114, and, at their other end, can be associated with the differential input of the capacitive feedback amplifier component 114 (e.g., the differential input of the amplifier component 118 of the capacitive feedback amplifier component 114) and the capacitive bridge component 108. For instance, the positive (+) output terminal of the amplifier component 118 and OCMFB 120 can be connected to one end of the feedback capacitor 128, and the other end of the feedback capacitor 128 can be connected to the negative input terminal of the amplifier component 118. The negative (−) output terminal of the amplifier component 118 and OCMFB 120 can be connected to one end of the feedback capacitor 130, and the other end of the feedback capacitor 130 can be connected to the positive input terminal of the amplifier component 118. The voltage signal (e.g., $V_{outp}$) output from the positive output terminal of the amplifier component 118 and OCMFB 120 can be fed back to the negative input terminal of the amplifier component 118, as well as the one input of the ICMFB 116, via the feedback capacitor 128, and the voltage signal (e.g., $V_{outn}$) output from the negative output terminal of the amplifier component 118 and OCMFB 120 can be fed back to the positive input terminal of the amplifier component 118, as well as the other input of the ICMFB 116, via the feedback capacitor 130. In certain embodiments, the feedback capacitor 128 and the feedback capacitor 130 can be programmable, variable, adjustable, or settable such that the capacitance values of the feedback capacitors 128 and 130 can be varied or adjusted, as desired. By employing capacitive feedback paths, via the feedback capacitor 128 and the feedback capacitor 130, as opposed to using existing resistive feedback techniques, employing feedback or switch cap resistors, the C2V converter component 102 can reduce the amount of noise being injected in the amplifier feedback for the capacitive feedback amplifier component 114, as resistive feedback around a charge amplifier, such as the capacitive feedback amplifier component 114, can otherwise result in increased noise injected in the amplifier feedback.

As disclosed, in some embodiments, the C2V converter component 102 can be a continuous time single drive C2V converter. For instance, the sensor component 104 and the third capacitive DAC component 106 can be driven by the first reference voltage signal (e.g., $V_{refp}$), which can be received from a sensor drive component 132 that can be connected to C2V converter component 102. The capacitive bridge component 108 can be driven by the second reference voltage signal (e.g., $V_{refn}$), which can be received from the sensor drive component 132. That is, the C2V converter component 102 can involve a single drive in that the same first reference voltage signal desirably can be applied to (e.g., can drive) the sensor component 104 and the third capacitive DAC component 106 (e.g., offset capacitive DAC), while the second reference voltage signal can be applied to the first capacitive DAC component 110 and second capacitive DAC component 112 of the capacitive bridge component 108. In certain embodiments, the first reference voltage signal can have a first square waveform that can have a desired amplitude and desired frequency, and the second reference voltage signal can have a second square waveform that can have the desired amplitude and the desired frequency, wherein the second square waveform can be inverse to or opposite of the first square waveform (e.g., when the first square waveform is at a high level, the second square waveform can be at a low level, and when the first square waveform is at a low level, the second square waveform can be at a high level). In other embodiments, the first reference voltage signal and the second reference voltage signal can have a waveform other than a square waveform.

The common mode or differential output (e.g., $V_{outp}$-$V_{outn}$) of the C2V converter component 102 can be determined or given by the following example equation 1 (Eq. 1):

$$V_{outp} - V_{outn} = \left(\frac{V_{refp} - V_{refn}}{2}\right)\left(\frac{C_s - C_{dac}}{C_f}\right), \quad \text{(Eq. 1)}$$

wherein $V_{refp}$ can be the first reference voltage signal, $V_{refn}$ can be the second reference voltage signal, $C_s$ can be the capacitance value of the sensor component 104, $C_{dac}$ can be the capacitance value of the third capacitive DAC component 106, and $C_f$ can be the capacitance value of the feedback capacitor 128.

As disclosed, the C2V converter component 102 (e.g., continuous time single drive C2V converter) can have the capacitively coupled ICMFB 116. This ICMFB 116 can be desirable (e.g., wanted, needed, or otherwise desired) to set the input common mode for the capacitive feedback amplifier component 114. The ICMFB 116 also can be desirable (e.g., suitable, enhanced, or optimal) because it can remove noise from or associated with the sensor drive circuit of the sensor drive component 132. For instance, since the C2V converter component 102 can be a continuous time single drive C2V converter, and the same reference voltage signal (e.g., the first reference voltage signal (e.g., $V_{refp}$)) can be applied to (e.g., applied to drive) the sensor component 104 and the third capacitive DAC component 106, that same reference voltage signal can be applied to both the positive element (e.g., positive terminal) and negative element (e.g., negative terminal) of the capacitive feedback amplifier component 114. As a result, any noise that may be on that drive voltage (e.g., the first reference voltage signal) can be present on both the positive element and the negative element of the capacitive feedback amplifier component 114 (e.g., the positive element and the negative element of the amplifier component 118 of the capacitive feedback amplifier component 114), and since a subtraction can be done with regard to the positive element and the negative element, any such noise can be removed, eliminated, or canceled out from the drive voltage.

It also is noted that, since the ICMFB 116 can be capacitively coupled, the input nodes (e.g., positive input and negative input) of the capacitive feedback amplifier component 114 can be desirably high ohmic points. In that regard, the common mode feedback at the input of the capacitive feedback amplifier component 114 can be capacitively common mode feedback, where the input common mode feedback can be structured using capacitors, and not resistors. As a result, any noise (e.g., noise associated with the drive voltage or otherwise associated with the sensor drive component 132 or C2V converter component 102) that may appear as a common mode component of the ICMFB circuit and can be removed, eliminated, or canceled out because there can be a differential readout at the input of the amplifier component 118.

In some embodiments, the C2V converter component 102 can include a reset switch component 134 that can be associated with (e.g., connected to) the capacitive feedback amplifier component 114 (e.g., the capacitively coupled ICMFB 116 and the amplifier component 118 of the capacitive feedback amplifier component 114), the sensor component 104, the capacitive DAC component 106, and the capacitive bridge component 108. In some instances, due to leakage or other factors, the voltage level associated with the input nodes of the capacitive feedback amplifier component 114 (e.g., the input terminals of the amplifier component 118) occasionally may drift away from (e.g., drift above) the defined voltage level (e.g., $V_{cmin}$). To facilitate avoiding undesired (e.g., unwanted) run-away of the input common mode voltage associated with the capacitive feedback amplifier component 114 (e.g., the ICMFB 116 of the capacitive feedback amplifier component 114), the reset switch component 134 can be triggered or switched to facilitate performing a reset at the input nodes of the differential input of the capacitive feedback amplifier component 114 to facilitate resetting or adjusting a voltage level at the input nodes to be at or at least near a desired defined voltage level (e.g., $V_{cmin}$). The reset can be event triggered or can be performed at a desirably low and fixed repetition rate (e.g., reset pulse repetition rate)

For instance, at desired times (e.g., at a desired rate (e.g., rate of switching) and/or when the input voltage associated with the capacitive feedback amplifier component 114 is determined or detected to be at a voltage level that is above (or below) the defined voltage level (e.g., $V_{cmin}$) by a threshold voltage amount), and based at least in part on a reset pulse applied to the reset switch component 134, the reset switch component 134 can be closed (e.g., switched from an open state to a closed state) to connect the input nodes of the capacitive feedback amplifier component 114 to the voltage source component 126 that can supply a voltage at the defined voltage level to adjust or reset the voltage level to, or substantially close to, the defined voltage level (e.g., $V_{cmin}$) at the input nodes of the capacitive feedback amplifier component 114. The reset switch component 134 can be opened (e.g., transitioned to the off state) after resetting or adjusting such voltage level to, or substantially close to, the defined voltage level. The switching on and off of the reset switch component 134 typically can be relatively short or momentary. In some embodiments, the reset switch component 134 and/or resetting process can be controlled or programmed by a processor component (not shown in FIG. 1), which can control and/or apply the reset pulse to the reset switch component 134, such as described herein.

It is noted that, due in part to the input nodes of the capacitive feedback amplifier component 114 being desirably high ohmic points, the voltage level associated with the input nodes of the capacitive feedback amplifier component 114 desirably does not drift away from the defined voltage level by the threshold voltage amount and have to be reset to the defined voltage level too often, and the reset switch component 134 typically only may be closed at a desirably low (e.g., very low) rate to reset such voltage to the defined voltage level. For instance, with regard to reset pulses applied at a desirably low and fixed repetition rate, the reset pulse can be applied to the reset switch component 134 at the desirably low repetition rate that can be significantly lower than the switching frequency of the C2V converter component 102. While such switching of the reset switch component 134 can inject noise into the circuit of the C2V converter component 102, since such switching of the reset switch component 134 typically can be done at a desirably low rate or otherwise done relatively infrequently (e.g., on the order of seconds or tens of seconds), the amount of noise associated with such switching of the reset switch component 134 can be relatively minimal or negligible compared to the overall noise associated with the C2V converter component 102 (where the overall noise itself also can be relatively and desirably low), and may not make any significant contribution to noise associated with the circuit of the C2V converter component 102.

The C2V converter component 102, as described herein, can have more desirable (e.g., suitable, improved, increased, or optimal) suppression or rejection of noise and disturbance of or associated with the sensor drive component 132, as compared to existing C2V converters. Since the sensor component 104 and the third capacitive DAC component 106 (e.g., offset DAC capacitor) can be driven with the same voltage, the first reference voltage signal, there can be desirably good suppression of noise on or associated with the sensor drive component 132. For instance, noise on the sensor drive voltage (e.g., the first reference voltage signal) can be present on both signal of the sensor component 104 and the signal of the third capacitive DAC component 106 (e.g., offset DAC capacitor), and accordingly, for an offset capacitance equal to sensor capacitance (e.g., $C_{offset}=C_s$), the sensor drive noise associated with the sensor drive component 132 can be eliminated or at least substantially eliminated or reduced.

For reasons similar to above (e.g., with regard to driving the sensor component 104 and the third capacitive DAC component 106 with the same voltage) and the symmetrical or at least substantially symmetrical structure of the C2V converter component 102 (e.g., the symmetry or substantial symmetry of the sensor component 104 and the third capacitive DAC component 106, and symmetry of the first capacitive DAC component 110 and second capacitive DAC component 112 of the capacitive bridge component 108), the C2V converter component 102 desirably (e.g., suitably, enhancedly, or optimally) can have increased, and inherently and desirably good, PSRR towards the sensor drive component 132, as compared to existing C2V converters. For the C2V converter component 102, employing the single sensor component 104 along with the third capacitive DAC component 106, the noise of the ICMFB amplifier can be injected in a symmetrical way, which can facilitate desirable rejection or suppression of such noise, however, there still may be some undesirable noise contribution of the ICMFB 116 at the output of the capacitive feedback amplifier component 114, and thus, the output of the C2V converter component 102, due in part to some asymmetry in the loading of the positive side (e.g., positive terminal) and negative side (e.g., negative terminal) of the capacitive feedback amplifier component 114, although the overall suppression or rejection of noise of or associated with the C2V converter component 102 can still be desirably improved or increased over existing C2V converters. The C2V converter component 102 also desirably can have increased reduction of rectification effects from RF components associated with the system 100 (e.g., increased reduction of rectification effects from RF components on the bond wire of the top electrode of the sensor drive component 132), as compared to existing C2V converters. The C2V converter component 102 also desirably can have improved or increased rejection or suppression of parasitic capacitances (e.g., parasitic capacitances 136 and 138 (e.g., $C_{pt}$ and $C_{pb}$)) associated with the sensor component 104, as compared to existing C2V converters. The symmetrical or at least substantially symmetrical structure of the C2V converter component 102 also desirably can result in the C2V converter component 102 being less sensitive to capacitive coupling in the circuit layout, as compared to existing C2V converters.

Further, the C2V converter component 102 can have a more desirable (e.g., suitable, improved, increased, or optimal) noise-current tradeoff than existing C2V converters. This can be due in part to the C2V converter component 102 having no noise folding, or at least substantially no noise folding, and the noise of the sensor drive component 132 being removed or at least substantially removed by the ICMFB 116, the ICMFB being purely capacitively coupled, wherein, as a result, the input nodes of the capacitive feedback amplifier component 114 can be desirably high ohmic. Further, in contrast to existing C2V converters, the C2V converter component 102 does not contain switching nodes, such as, for example, switch cap resistors or feedback resistors, at the input nodes of the capacitive feedback amplifier component 114 that can inject undesirable noise in the capacitive feedback amplifier component 114, and only has a reset switch component 134 that can be switched at a desirably low rate (e.g., on the order of seconds or tens of seconds) such that the reset switch component 134 only may contribute relatively minimal or negligible noise to the circuit of the C2V converter component 102. In some embodiments, the performance (e.g., noise-current performance) improvement of the C2V converter component 102, employing the single sensor component 104, can be a factor of three or approximately three over existing dual drive C2V converters.

Figure 2:
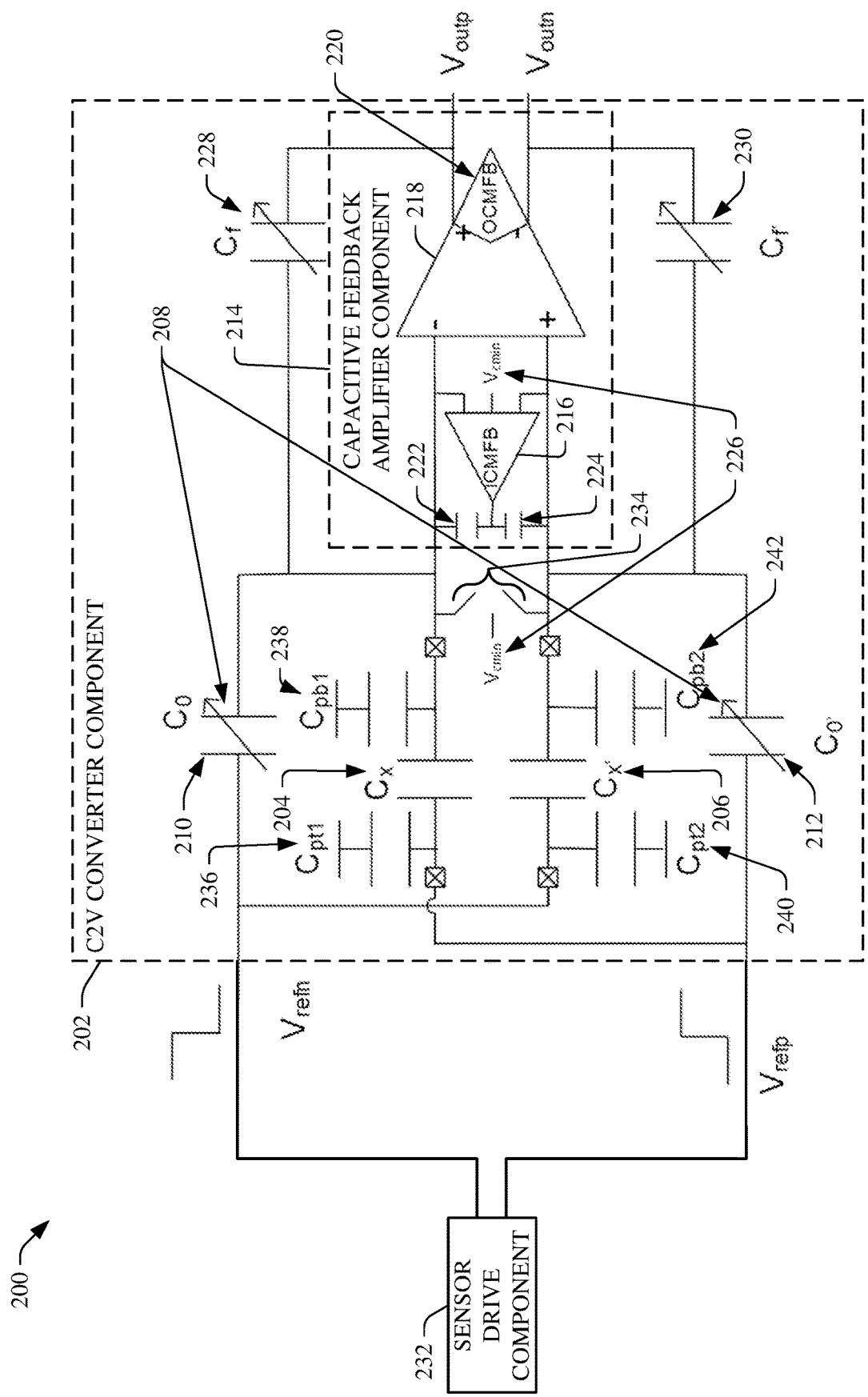
FIG. 2 illustrates a diagram of an example system that can comprise a C2V converter component, comprising a balanced single sensor component, in accordance with various aspects and embodiments of the disclosed subject matter.

Referring to FIG. 2, FIG. 2 illustrates a diagram of an example system 200 that can comprise a C2V converter component, comprising a balanced single sensor component, in accordance with various aspects and embodiments of the disclosed subject matter. The system 200 can comprise, or can be used in connection with, a pressure sensor, a balanced single sensor, a capacitive sensor, a capacitive antenna, and/or other types of sensors, components, or devices. In some implementations, the system 200 can be, can comprise, or can be used in connection with a MEMS or semiconductor sensor.

The system 200 can be or can comprise a C2V converter component 202 that can convert a capacitance value to a voltage signal having a voltage level that can correspond to the capacitance value. In some embodiments, the C2V converter component 202 can be a continuous time single drive C2V converter. In certain embodiments, the C2V converter component 202 can be utilized in a first stage of a signal chain of the system 200 or associated device to facilitate desirable (e.g., suitable, enhanced, or optimal) signal conditioning for addressing amplification of a signal at low noise with desirably good suppression of interfering RF fields and rejection of parasitic capacitances of the sensor component(s) and/or other noise associated with the system 200 or associated device. The C2V converter component 202 of FIG. 2 can be substantially similar to the C2V converter component 102 of FIG. 1, except, for example, the C2V converter component 202 can comprise a balanced sensor component, whereas the C2V converter component 102 can comprise a single sensor component.

The C2V converter component 202 can comprise a first sensor component 204 (e.g., a capacitive sensor component ($C_x$)) and a second sensor component 206 ($C_{x'}$) in the C2V converter circuit. The first sensor component 204 and the second sensor component 206 can form a balanced single sensor component. In some embodiments, the first sensor component 204 and the second sensor component 206 each can be half or approximately half the size (e.g., in capacitance value) as a capacitive sensor of a single sensor implementation (e.g., the sensor component 104 of FIG. 1), although, in other embodiments, the first sensor component 204 and the second sensor component 206 can have another desired capacitive size. In certain embodiments, to facilitate a desired symmetry of the C2V converter component 202, a first capacitive value of the first sensor component 204 and a second capacitance value of the second sensor component 206 can be the same or substantially the same. In accordance with various embodiments, the C2V converter component 202, the first sensor component 204, the second sensor component 206, and/or another component(s) of the system 200 can be MEMS components that can be formed using MEMS technology.

The C2V converter component 202 also desirably can comprise a capacitive bridge component 208 that can be associated with (e.g., electrically or logically connected to) the first sensor component 204 and the second sensor component 206. The capacitive bridge component 208 can comprise a first capacitive DAC component 210 (e.g., $C_0$) and a second capacitive DAC component 212 (e.g., $C_{0'}$). The first capacitive DAC component 210 and second capacitive DAC component 212 can create a differential node (e.g., a "dummy" differential node) to form the capacitive bridge. The first sensor component 204 can be associated with (e.g., connected to) the first capacitive DAC component 210 (e.g., one end (e.g., port, terminal, or plate) of the first capacitive DAC component 210 can be connected to an end of the first sensor component 204 at a first node of the differential node), and the first capacitive DAC component 210 also can be associated with the second sensor component 206 (e.g., another end (e.g., another port, terminal, or plate) of the first capacitive DAC component 210 can be connected to an end of the second sensor component 206). The second sensor component 206 can be associated with the second capacitive DAC component 212 (e.g., one end of the second capacitive DAC component 212 can be connected to an end of the second sensor component 206 at a second node of the differential node), and the second capacitive DAC component 212 also can be associated with the first sensor component 204 (e.g., another end (e.g., another port, terminal, or plate) of the second capacitive DAC component 212 can be connected to an end of the first sensor component 204).

The C2V converter component 202 can comprise, and the capacitive bridge component 208 can be associated with (e.g., electrically or logically connected to), a capacitive feedback amplifier component 214. The capacitive feedback amplifier component 214 can comprise an ICMFB 216 (e.g., ICMFB circuit, which can be or can comprise an ICMFB amplifier component), an amplifier component 218 (e.g., main amplifier or charge amplifier), and an OCMFB 220 (e.g., an OCMFB circuit) at or associated with the output (e.g., a common mode output, which can be a differential output) of the capacitive feedback amplifier component 214, such as described herein. In some embodiments, the capacitive bridge component 208 (e.g., the differential node associated with the capacitive bridge component 208) can be connected to a differential input of the amplifier component 218 and inputs of the ICMFB 216. For example, the first capacitive DAC component 210 (and the first sensor component 204) can be connected to the negative input (e.g., negative input terminal) of the amplifier component 218 and one of the inputs of the ICMFB 216, and the second capacitive DAC component 212 (and the second sensor component 206) can be connected to the positive input (e.g., positive input terminal) of the amplifier component 218 and the other input of the ICMFB 216.

In some embodiments, the ICMFB 216 can be a capacitively coupled ICMFB 216 (e.g., ICMFB circuit comprising an ICMFB amplifier component). To facilitate the capacitive coupling, the C2V converter component 202 can comprise a capacitor component 222 and a capacitor component 224. One end of the capacitor component 222 can be connected to the negative input of the amplifier component 218, the one input of the ICMFB 216, the first capacitive DAC component 210, and the first sensor component 204, and the other end of the capacitor component 222 can be connected to an output of the capacitively coupled ICMFB 216. Also, one end of the capacitor component 224 can be connected to the positive input of the amplifier component 218, the other input of the ICMFB 216, the second capacitive DAC component 212, and the second sensor component 206, and the other end of the capacitor component 224 can be connected to the output of the capacitively coupled ICMFB 216. Accordingly, the output from the ICMFB 216 (e.g., an output voltage signal output from the output port of the ICMFB amplifier component) can be capacitively coupled towards the negative (−) input and the positive (+) input of the amplifier component 218. In some embodiments, the capacitor component 222 and capacitor component 224 can be relatively small in capacitance as compared to other capacitive components (e.g., the first sensor component 204, the second sensor component 206, and/or the capacitive DAC components) of the system 200.

In certain embodiments, the capacitively coupled ICMFB 216 (e.g., the capacitively coupled ICMFB amplifier component) can receive a defined voltage level (e.g., $V_{cmin}$) from a voltage source component 226 that can generate and/or supply a voltage at the defined voltage level. In some embodiments, the defined voltage level (e.g., $V_{cmin}$) can be a reference voltage that can be set as a function of a first reference voltage signal (e.g., $V_{refp}$) and a second reference voltage signal (e.g., $V_{refn}$) that can be associated with the C2V converter component 202, such as described herein. For example, the defined voltage level (e.g., $V_{cmin}$) for such reference voltage can be set or programmed as $$\left(\frac{V_{refp} + V_{refn}}{2}\right).$$

The input common mode feedback loop associated with the capacitively coupled ICMFB 216 can operate, at least in part, as follows. The difference between the reference voltage (e.g., $V_{cmin}$) and the voltage level of the common mode component of the positive (+) input and the negative (−) input of the amplifier component 218 can be amplified by the ICMFB 216 (e.g., the ICMFB amplifier component) based at least in part on a gain level of the ICMFB 216. As disclosed, the output from the ICMFB 216 (e.g., the output voltage signal output from the output port of the ICMFB amplifier component) can be capacitively coupled towards the negative (−) input and the positive (+) input of the amplifier component 218. In this way, the common mode component of the input of the amplifier component 218 can be regulated towards the reference voltage (e.g., $V_{cmin}$) by or as facilitated by the capacitively coupled ICMFB 216. For instance, the voltage level of the common mode component at the negative (−) input and/or the positive (+) input of the amplifier component 218 can desirably be controlled to be or remain at or substantially close to the reference voltage (e.g., $V_{cmin}$), as regulated using the capacitively coupled ICMFB 216.

In some embodiments, for this gain stage involving the capacitive feedback amplifier component 214, the capacitive feedback amplifier component 214 (e.g., each of the amplifier component 218 and/or the ICMFB 216) can have a programmable, settable, or adjustable gain setting to facilitate setting the gain of the capacitive feedback amplifier component 214 to a desired gain level that can be, for example, 1.0 or greater than 1.0. The capacitive feedback amplifier component 214 desirably can employ no sampling of the signal of the balanced sensor component. Since no sampling of the signal is being performed, the capacitive feedback amplifier component 214 can be a continuous amplifier (e.g., a continuous time AFE amplifier), and accordingly and desirably, there can be no fold back noise or at least substantially no noise folding (e.g., noise is not folded back from high frequency to lower frequency due to aliasing, which can result from sampling of the signal). The capacitive feedback amplifier component 214 can have a differential output (e.g., $V_{outp}$ and $V_{outn}$), which also can be the differential output of the C2V converter component 202.

In certain embodiments, the capacitive feedback amplifier component 214 can comprise a common mode output (e.g., $V_{outp}$ and $V_{outn}$), which also can be the common mode output of the C2V converter component 202 (as well as a differential output of the C2V converter component 202). For instance, as disclosed, the capacitive feedback amplifier component 214 can comprise the OCMFB 220 (e.g., an OCMFB circuit) at or associated with the output (e.g., differential output) of the amplifier component 218 of the capacitive feedback amplifier component 214. The capacitive feedback amplifier component 214, with the OCMFB 220, can generate a common mode voltage signal (e.g., $V_{outp}$-$V_{outn}$) as an output based at least in part on the respective capacitances of the first sensor component 204 and the second sensor component 206 that can be input to the capacitive feedback amplifier component 214, the gain level of the amplifier component 218, and/or the gain level of the ICMFB 216, wherein the respective capacitances of the first sensor component 204 and the second sensor component 206 can be based at least in part on (e.g., can correspond to or be a function of) a sensed or measured value or level of the condition sensed by the first sensor component 204 and the second sensor component 206.

The common mode voltage signal at the output of the OCMFB 220 desirably can be fed back to the ICMFB 216, the differential input of the amplifier component 218, and the capacitive bridge component 208 via a feedback capacitor ($C_f$) 228 and a feedback capacitor ($C_f$) 230. In some embodiments, the positive output terminal of the amplifier component 218 and OCMFB 220 can be connected to one end of the feedback capacitor 228, and the other end of the feedback capacitor 228 can be connected to the negative input terminal of the amplifier component 218. The negative output terminal of the amplifier component 218 and OCMFB 220 can be connected to one end of the feedback capacitor 230, and the other end of the feedback capacitor 230 can be connected to the positive input terminal of the amplifier component 218. The voltage signal (e.g., $V_{outp}$) output from the positive output terminal of the amplifier component 218 and OCMFB 220 can be fed back to the negative input terminal of the amplifier component 218, as well as the one input of the ICMFB 216, via the feedback capacitor 228, and the voltage signal (e.g., $V_{outn}$) output from the negative output terminal of the amplifier component 218 and OCMFB 220 can be fed back to the positive input terminal of the amplifier component 218, as well as the other input of the ICMFB 216, via the feedback capacitor 230. In certain embodiments, the feedback capacitor 228 and the feedback capacitor 230 can be programmable, variable, adjustable, or settable such that the capacitance values of the feedback capacitors 228 and 230 can be varied or adjusted, as desired. By employing capacitive feedback paths, via the feedback capacitor 228 and the feedback capacitor 230, as opposed to using existing resistive feedback techniques, employing feedback resistors or switch cap resistors, the C2V converter component 202 can reduce the amount of noise being injected in the amplifier feedback for the capacitive feedback amplifier component 214, as compared to some existing C2V converters that employ feedback resistors or switch cap resistors.

The common mode or differential output (e.g., $V_{outp}$-$V_{outn}$) of the C2V converter component 202 can be determined as a function of the first reference voltage signal (e.g., $V_{refp}$), the second reference voltage signal (e.g., $V_{refn}$), the capacitance value of the first sensor component 204 ($C_x$), the capacitance value of the second sensor component 206 ($C_{x'}$), and the capacitance value of the feedback capacitor 228 ($C_f$).

As disclosed, in some embodiments, the C2V converter component 202 can be a continuous time single drive C2V converter. In certain embodiments, the first sensor component 204 and the second capacitive DAC component 212 can be driven by the first reference voltage signal (e.g., $V_{refp}$), which can be received from a sensor drive component 232 that can be connected to C2V converter component 202. The second sensor component 206 and the first capacitive DAC component 210 can be driven by the second reference voltage signal (e.g., $V_{refn}$), which can be received from the sensor drive component 232. The first reference voltage signal and the second reference voltage signal can have respective characteristics (e.g., waveform characteristics, amplitude characteristics, or other signal characteristics), such as described herein.

As disclosed, the C2V converter component 202 (e.g., continuous time single drive C2V converter) can have the capacitively coupled ICMFB 216. This ICMFB 216 can be desirable (e.g., wanted, needed, or otherwise desired) to set the input common mode for the capacitive feedback amplifier component 214. The ICMFB 216 also can be desirable (e.g., suitable, enhanced, or optimal) because it can remove noise from or associated with the sensor drive circuit of the sensor drive component 232. Since the ICMFB 216 can be capacitively coupled, the positive and negative inputs of the capacitive feedback amplifier component 214 can be desirably high ohmic points. In that regard, the common mode feedback at the input of the capacitive feedback amplifier component 214 can be capacitively common mode feedback, where the input common mode feedback can be structured using capacitors, and not resistors. As a result, any noise (e.g., noise associated with the drive voltage or otherwise associated with the sensor drive component 232 or C2V converter component 202) that may appear can be a common mode component of the ICMFB circuit of the ICMFB 216 and desirably (e.g., suitably, enhancedly, or optimally) can be removed, eliminated, or canceled out because it can be a differential readout at the input of the amplifier component 218.

In certain embodiments, the C2V converter component 202 can include a reset switch component 234 that can be associated with (e.g., connected to) the capacitive feedback amplifier component 214 (e.g., the capacitively coupled ICMFB 216 and the amplifier component 218), the first sensor component 204, the second sensor component 206, and the capacitive bridge component 208. As disclosed, in some instances, due to leakage or other factors, the voltage level associated with the input nodes of the capacitive feedback amplifier component 214 (e.g., the input terminals of the amplifier component 218) occasionally may drift away from (e.g., drift above) the defined voltage level (e.g., $V_{cmin}$). At desired times (e.g., at a desired rate and/or when the input voltage associated with the capacitive feedback amplifier component 214 is determined or detected to be at a voltage level that is above (or below) the defined voltage level (e.g., $V_{cmin}$) by a threshold voltage amount), the reset switch component 234 can be switched (e.g., transitioned) to a closed or on state to connect the input nodes of the capacitive feedback amplifier component 214 to the voltage source component 226 that can supply a voltage at the defined voltage level to adjust or reset the voltage level to, or at least substantially close to, the defined voltage level (e.g., $V_{cmin}$) at the input nodes of the capacitive feedback amplifier component 214. The reset switch component 234 can be switched to an open state after resetting or adjusting such voltage level to the defined voltage level. It is noted that, due in part to the input nodes of the capacitive feedback amplifier component 214 being desirably high ohmic points, the voltage level associated with the input nodes of the capacitive feedback amplifier component 214 desirably may not drift away from the defined voltage level by the threshold voltage amount and have to be reset to the defined voltage level very often, and the reset switch component 234 typically may only be closed at a desirably low (e.g., very low) rate (e.g., low reset pulse repetition rate) to reset such voltage at the input nodes to, or at least substantially close to, the defined voltage level. While such switching of the reset switch component 234 can inject noise into the circuit of the C2V converter component 202, since such switching of the reset switch component 234 typically can be done at a desirably low rate, the amount of noise associated with such switching of the reset switch component 234 can be relatively minimal or negligible, and may not make any significant contribution to noise associated with the circuit of the C2V converter component 202.

The C2V converter component 202 can have more desirable (e.g., suitable, improved, increased, or optimal) suppression or rejection of noise and disturbance of or associated with the sensor drive component 232, as compared to existing C2V converters, and even over the C2V converter component 102 of FIG. 1. As compared to existing C2V converters, the C2V converter component 202 can have enhanced (e.g., improved, increased, or optimal) performance and reduced noise (e.g., reduced sensor drive noise and/or other noise) due in part to less amplification of operational amplifier (e.g., charge amplifier) noise of the capacitive feedback amplifier component 214 due in part to a relatively smaller amount of capacitance at the input nodes of the capacitive feedback amplifier component 214, which can be the result from the balanced single sensor component having two sensor components (e.g., 204 and 206) that can be half the size of a typical single sensor. Also, as compared to existing C2V converters, the C2V converter component 202 can have enhanced (e.g., improved, increased, or optimal) performance and reduced noise due in part to the noise of the ICMFB 216 desirably (e.g., suitably, enhancedly, or optimally) being able to be symmetrically injected and symmetrically loaded as a result of the symmetrical, or at least substantially symmetrical, structure of the C2V converter component 202 (e.g., symmetrical structure of the first and second sensor components 204 and 206 of the balanced sensor component, and symmetrical structure of the first and second capacitive DAC components 210 and 212). Since the noise of the ICMFB 216 desirably can be symmetrically injected and symmetrically loaded, this can bring the ICMFB noise at common mode at the output of the capacitive feedback amplifier component 214, and accordingly, the C2V converter component 202, and such ICMFB noise can be rejected or suppressed, or at least substantially rejected or suppressed, by a succeeding capacitively coupled amplifier (not shown in FIG. 2).

For reasons similar to above, and due in part to the symmetrical, or at least substantially symmetrical, structure of the C2V converter component 202, the C2V converter component 202 desirably (e.g., suitably, enhancedly, or optimally) can have increased, and inherently and desirably good, PSRR towards the sensor drive component 232, as compared to existing C2V converters. The C2V converter component 202 also desirably can have increased reduction of rectification effects from RF components associated with the system 200 (e.g., increased reduction of rectification effects from RF components on the bond wire of the top electrode of the sensor drive component 232), as compared to existing C2V converters. The C2V converter component 202 also desirably can have improved or increased rejection or suppression of parasitic capacitances (e.g., parasitic capacitances 236, 238, 240, and 242 (e.g., $C_{pt1}$, $C_{pb1}$, $C_{pt2}$, and $C_{pb2}$) associated with the first and second sensor components 204 and 206, as compared to existing C2V converters. The symmetrical, or at least substantially symmetrical, structure of the C2V converter component 202 also desirably can result in the C2V converter component 202 being less sensitive to capacitive coupling in the circuit layout, as compared to existing C2V converters.

Further, the C2V converter component 202 can have a more desirable (e.g., suitable, improved, increased, or optimal) noise-current tradeoff than existing C2V converters. This can be due in part to the C2V converter component 202 having no noise folding, or at least substantially no noise folding, and the noise of the sensor drive component 232 being removed or at least substantially removed by the ICMFB 216, the ICMFB being purely capacitively coupled, wherein, as a result, the input nodes of the capacitive feedback amplifier component 214 can be desirably high ohmic. Further, in contrast to existing C2V converters, the C2V converter component 202 does not contain switching nodes, such as, for example, switch cap resistors or feedback resistors, at the input nodes of the capacitive feedback amplifier component 214 that can inject undesirable noise in the capacitive feedback amplifier component 214, and only has a reset switch component 234 that can be switched at a desirably low rate (e.g., on the order of seconds or tens of seconds) such that the reset switch component 234 only may contribute relatively minimal or negligible noise to the circuit of the C2V converter component 202. In certain embodiments, the performance (e.g., noise-current performance) improvement of the C2V converter component 202, employing the balanced single sensor component (e.g., employing the first and second sensor components 204 and 206), can be a factor of five or approximately five over existing dual drive C2V converters.

Figure 3:
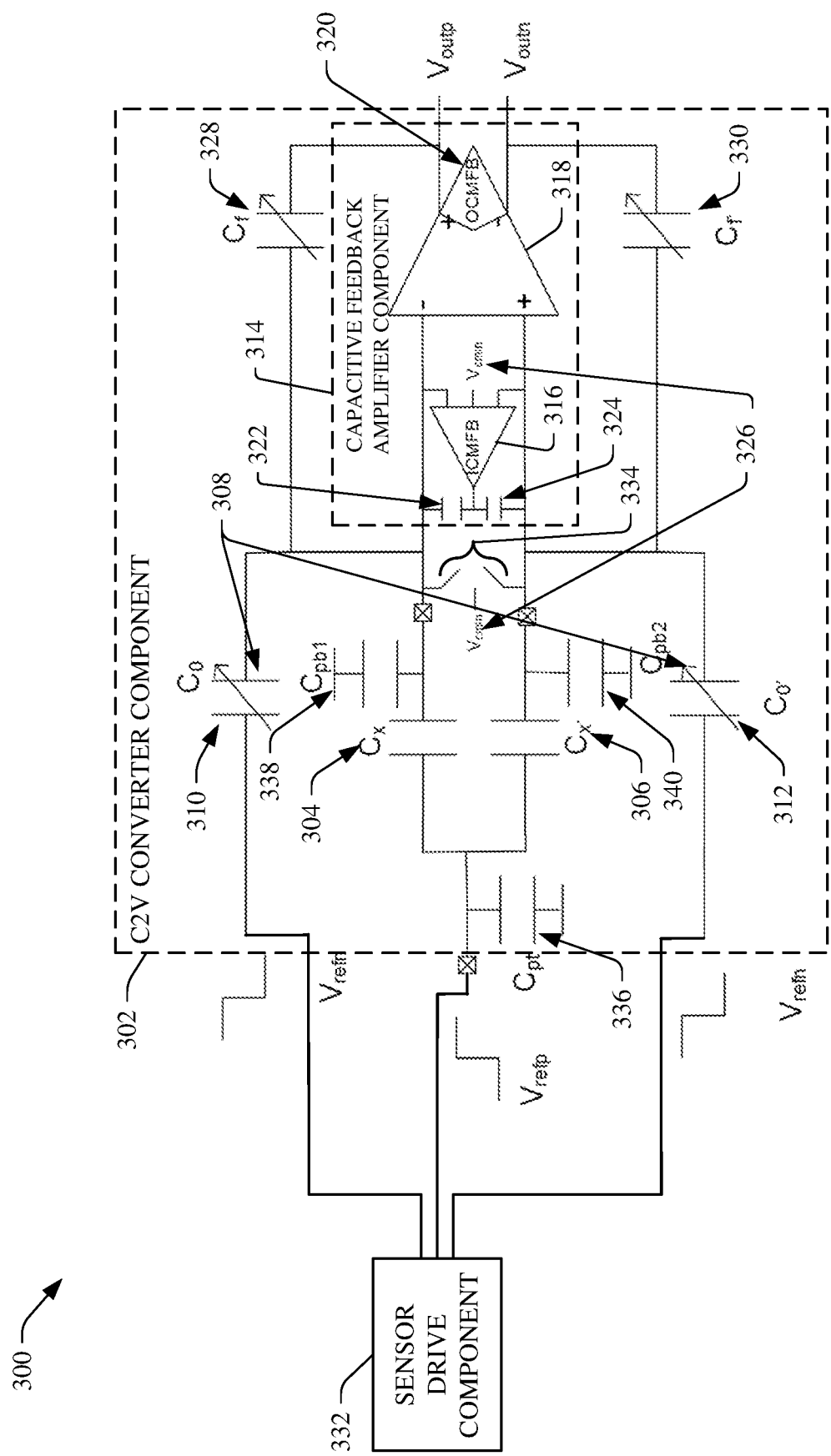
FIG. 3 depicts a diagram of an example system that can comprise a C2V converter component, comprising a differential sensor component, in accordance with various aspects and embodiments of the disclosed subject matter.

FIG. 3 depicts a diagram of an example system 300 that can comprise a C2V converter component, comprising a differential sensor component, in accordance with various aspects and embodiments of the disclosed subject matter. The system 300 can comprise, or can be used in connection with, a differential sensor, a differential pressure sensor, an accelerometer or other motion sensor, a capacitive sensor, a capacitive antenna, and/or other types of sensors, components, or devices. In some implementations, the system 300 can be, can comprise, or can be used in connection with a MEMS or semiconductor sensor.

The system 300 can be or can comprise a C2V converter component 302 that can convert a capacitance value to a voltage signal having a voltage level that can correspond to the capacitance value. In some embodiments, the C2V converter component 302 can be a continuous time single drive C2V converter. In certain embodiments, the C2V converter component 302 can be utilized in a first stage of a signal chain of the system 300 or associated device to facilitate desirable (e.g., suitable, enhanced, or optimal) signal conditioning for addressing amplification of a signal at low noise with desirably good suppression of interfering RF fields and rejection of parasitic capacitances of the sensor components and/or other noise associated with the system 300 or associated device. The C2V converter component 302 of FIG. 3 can be substantially similar to the C2V converter component 102 of FIG. 1 and the C2V converter component 202 of FIG. 2, except, for example, the C2V converter component 302 can comprise a differential sensor component, whereas the C2V converter component 102 can comprise a single sensor component and the C2V converter component 202 can comprise a balanced single sensor component.

The C2V converter component 302 can comprise a first sensor component 304 (e.g., a capacitive sensor component ($C_x$)) and a second sensor component 306 ($C_{x'}$) that can be connected in series with the first sensor component 304 in the C2V converter circuit. The first sensor component 304 and the second sensor component 306 can form a differential sensor component. The first sensor component 304 and the second sensor component 306 each can be a desired size (e.g., in capacitance value). In certain embodiments, to facilitate desired symmetry of the C2V converter component 302, a first capacitive value of the first sensor component 304 and a second capacitance value of the second sensor component 306 can be the same or substantially the same. In accordance with various embodiments, the C2V converter component 302, the first sensor component 304, the second sensor component 306, and/or another component(s) of the system 300 can be MEMS components that can be formed using MEMS technology.

The C2V converter component 302 also desirably can comprise a capacitive bridge component 308 that can be associated with (e.g., electrically or logically connected to) the first sensor component 304 and the second sensor component 306. The capacitive bridge component 308 can comprise a first capacitive DAC component 310 (e.g., $C_0$) and a second capacitive DAC component 312 (e.g., $C_{.}$). The first capacitive DAC component 310 and second capacitive DAC component 312 can create a differential node (e.g., a "dummy" differential node) to form the capacitive bridge. The first sensor component 304 can be associated with the first capacitive DAC component 310 (e.g., an end (e.g., a port, terminal, or plate) of the first sensor component 304 can be connected to an end of the first capacitive DAC component 310 at a first node of the differential node), and the second sensor component 306 can be associated with the second capacitive DAC component 312 (e.g., an end of the second sensor component 306 can be connected to an end of the second capacitive DAC component 312 at a second node of the differential node).

The C2V converter component 302 can comprise, and the capacitive bridge component 308 can be associated with (e.g., electrically or logically connected to), a capacitive feedback amplifier component 314. The capacitive feedback amplifier component 314 can comprise an ICMFB 316 (e.g., ICMFB circuit, which can be or can comprise an ICMFB amplifier component), an amplifier component 318 (e.g., main amplifier or charge amplifier), and an OCMFB 320 (e.g., an OCMFB circuit) that can be at or associated with the output (e.g., a common mode output, which can be a differential output) of the capacitive feedback amplifier component 214, such as described herein. In some embodiments, the capacitive bridge component 308 (e.g., the differential node associated with the capacitive bridge component 308) can be connected to a differential input of the amplifier component 318 and inputs of the ICMFB 316 of the capacitive feedback amplifier component 314. For example, the first capacitive DAC component 310 (and the first sensor component 304) can be connected to the negative input (e.g., negative input terminal) of the amplifier component 318 and one of the inputs of the ICMFB 316, and the second capacitive DAC component 312 (and the second sensor component 306) can be connected to the positive input (e.g., positive input terminal) of the amplifier component 318 and the other input of the ICMFB 316.

In some embodiments, the ICMFB 316 can be a capacitively coupled ICMFB (e.g., ICMFB circuit, which can comprise a capacitively coupled ICMFB amplifier component). To facilitate the capacitive coupling, the C2V converter component 302 can comprise a capacitor component 322 and a capacitor component 324. One end of the capacitor component 322 can be connected to the negative input of the amplifier component 318, the one input of the ICMFB 316, the first capacitive DAC component 310, and the first sensor component 304, and the other end of the capacitor component 322 can be connected to an output of the capacitively coupled ICMFB 316. Also, one end of the capacitor component 324 can be connected to the positive input of the amplifier component 318, the other input of the ICMFB 316, the second capacitive DAC component 312, and the second sensor component 306, and the other end of the capacitor component 324 can be connected to the capacitively coupled ICMFB 316. Accordingly, the output from the ICMFB 316 (e.g., an output voltage signal output from the output port of the ICMFB amplifier component) can be capacitively coupled towards the negative (−) input and the positive (+) input of the amplifier component 318. In some embodiments, the capacitor component 322 and capacitor component 324 can be relatively small in capacitance as compared to other capacitive components (e.g., the first sensor component 304, the second sensor component 306, and/or the capacitive DAC components) of the system 300.

In certain embodiments, the capacitively coupled ICMFB 316 (e.g., the capacitively coupled ICMFB amplifier component) can receive a defined voltage level (e.g., $V_{cmin}$) from a voltage source component 326 that can generate and/or supply a voltage at the defined voltage level. In some embodiments, the defined voltage level (e.g., $V_{cmin}$) can be a reference voltage that can be set as a function of a first reference voltage signal (e.g., $V_{refp}$) and a second reference voltage signal (e.g., $V_{refn}$) that can be associated with the C2V converter component 302, such as described herein. For instance, the defined voltage level (e.g., $V_{cmin}$) for such reference voltage can be set or programmed as $$\left(\frac{V_{refp} + V_{refn}}{2}\right).$$

The input common mode feedback loop associated with the capacitively coupled ICMFB 316 can operate, at least in part, as follows. The difference between the reference voltage (e.g., $V_{cmin}$) and the voltage level of the common mode component of the positive (+) input and the negative (−) input of the amplifier component 318 can be amplified by the ICMFB 316 (e.g., the ICMFB amplifier component) based at least in part on a gain level of the ICMFB 316. As disclosed, the output from the ICMFB 316 (e.g., the output voltage signal output from the output port of the ICMFB amplifier component) can be capacitively coupled towards the negative (−) input and the positive (+) input of the amplifier component 318. In this way, the common mode component of the input of the amplifier component 318 can be regulated towards the reference voltage (e.g., $V_{cmin}$) by or as facilitated by the capacitively coupled ICMFB 316. For instance, the voltage level of the common mode component at the negative (−) input and/or the positive (+) input of the amplifier component 318 can desirably be controlled to be or remain at or substantially close to the reference voltage (e.g., $V_{cmin}$), as regulated using the capacitively coupled ICMFB 316.

In some embodiments, the capacitive feedback amplifier component 314 (e.g., each of the amplifier component 318 and/or the ICMFB 316) can have a programmable, settable, or adjustable gain setting to facilitate setting the gain of the capacitive feedback amplifier component 314 to a desired gain level that can be, for example, 1.0 or greater than 1.0. The capacitive feedback amplifier component 314 desirably can employ no sampling of the signal of the differential sensor component. Since no sampling of the signal is being performed, the capacitive feedback amplifier component 314 can be a continuous amplifier (e.g., a continuous time AFE amplifier), and accordingly and desirably, there can be no fold back noise or at least substantially no noise folding.

In certain embodiments, the capacitive feedback amplifier component 314 can have a common mode output (e.g., $V_{outp}$ and $V_{outn}$), which also can be the common mode output of the C2V converter component 302 (as well as a differential output of the C2V converter component 302). For instance, as disclosed, the capacitive feedback amplifier component 314 can comprise the OCMFB 320 (e.g., an OCMFB circuit) at or associated with the output (e.g., common mode output) of the amplifier component 318. The capacitive feedback amplifier component 314, with the OCMFB 320, can generate a common mode voltage signal (e.g., $V_{outp}$-$V_{outn}$) as an output based at least in part on the respective capacitances of the first sensor component 304 and the second sensor component 306 that can be input to the capacitive feedback amplifier component 314, the gain level of the amplifier component 318, and/or the gain level of the ICMFB 316, wherein the respective capacitances of the first sensor component 304 and the second sensor component 306 can be based at least in part on (e.g., can correspond to or be a function of) a sensed or measured value or level of the condition sensed by the first sensor component 304 and the second sensor component 306.

The common mode voltage signal at the output of the OCMFB 320 desirably can be fed back to the ICMFB 316, the differential input of the amplifier component 318, and the capacitive bridge component 308 via a feedback capacitor ($C_f$) 328 and a feedback capacitor ($C_f$) 330. In certain embodiments, the positive output terminal of the capacitive feedback amplifier component 314 and OCMFB 320 can be connected to one end of the feedback capacitor 328, and the other end of the feedback capacitor 328 can be connected to the negative input terminal of the amplifier component 318 as well as the one input of the ICMFB 316. The negative output terminal of the amplifier component 318 and OCMFB 320 can be connected to one end of the feedback capacitor 330, and the other end of the feedback capacitor 330 can be connected to the positive input terminal of the amplifier component 318 as well as the other input of the ICMFB 316. The voltage signal (e.g., $V_{outp}$) output from the positive output terminal of the amplifier component 318 and OCMFB 320 can be fed back to the negative input terminal of the amplifier component 318, as well as the one input of the ICMFB 316, via the feedback capacitor 328, and the voltage signal (e.g., $V_{outn}$) output from the negative output terminal of the amplifier component 318 and OCMFB 320 can be fed back to the positive input terminal of the amplifier component 318, as well as the other input of the ICMFB 316, via the feedback capacitor 330. In some embodiments, the feedback capacitor 328 and the feedback capacitor 330 can be programmable, variable, adjustable, or settable such that the capacitance values of the feedback capacitors 328 and 330 can be varied or adjusted, as desired. By employing capacitive feedback paths, via the feedback capacitor 328 and the feedback capacitor 330, as opposed to using existing resistive feedback techniques, employing feedback resistors or switch cap resistors, the C2V converter component 302 can reduce the amount of noise being injected in the amplifier feedback for the capacitive feedback amplifier component 314, as compared to some existing C2V converters that employ feedback resistors or switch cap resistors.

The common mode or differential output (e.g., $V_{outp}$-$V_{outn}$) of the C2V converter component 302 can be determined as a function of the first reference voltage signal (e.g., $V_{refp}$), the second reference voltage signal (e.g., $V_{refn}$), the capacitance value of the first sensor component 304 ($C_x$), the capacitance value of the second sensor component 306 ($C_{x'}$), and the capacitance value of the feedback capacitor 328 ($C_f$).

As disclosed, in some embodiments, the C2V converter component 302 can be a continuous time single drive C2V converter. For instance, the first sensor component 304 and the second sensor component 306 can be driven by a first reference voltage signal (e.g., $V_{refp}$) that can be received from a sensor drive component 332 that can be connected to C2V converter component 302. The capacitive bridge component 308 (e.g., the first capacitive DAC component 310 and the second capacitive DAC component 312) can be driven by a second reference voltage signal (e.g., $V_{refn}$) that can be received from the sensor drive component 332. That is, the C2V converter component 302 can involve a single drive in that the same first reference voltage signal desirably can be applied to (e.g., can drive) the first sensor component 304 and the second sensor component 306 of the differential sensor component, while the second reference voltage signal can be applied to the first capacitive DAC component 310 and second capacitive DAC component 312 of the capacitive bridge component 308. The first reference voltage signal and the second reference voltage signal can have respective characteristics (e.g., waveform characteristics, amplitude characteristics, or other signal characteristics), such as described herein.

As disclosed, the C2V converter component 302 (e.g., continuous time single drive C2V converter) can have the capacitively coupled ICMFB 316. This ICMFB 316 can be desirable (e.g., wanted, needed, or otherwise desired) to set the input common mode for the capacitive feedback amplifier component 314, such as described herein. The ICMFB 316 also can be desirable (e.g., suitable, enhanced, or optimal) because it can remove noise from or associated with the sensor drive circuit of the sensor drive component 332. Since the ICMFB 316 can be capacitively coupled, the positive and negative inputs of the capacitive feedback amplifier component 314 can be desirably high ohmic points. In that regard, the common mode feedback at the input of the capacitive feedback amplifier component 314 can be capacitively common mode feedback, where the input common mode feedback can be structured using capacitors, and not resistors. As a result, any noise (e.g., noise associated with the drive voltage or otherwise associated with the sensor drive component 332 or C2V converter component 302) that may appear can be a common mode component of the ICMFB circuit of the ICMFB 316 and desirably (e.g., suitably, enhancedly, or optimally) can be removed, eliminated, or canceled out because it can be a differential readout at the input of the amplifier component 318.

In certain embodiments, the C2V converter component 302 can include a reset switch component 334 that can be associated with (e.g., connected to) the capacitive feedback amplifier component 314 (e.g., the capacitively coupled ICMFB 316 and the amplifier component 318 of the capacitive feedback amplifier component 314), the first sensor component 304, the second sensor component 306, and the capacitive bridge component 308. As disclosed, in some instances, due to leakage or other factors, the voltage level associated with the input nodes of the capacitive feedback amplifier component 314 (e.g., the input terminals of the amplifier component 318) occasionally may drift away from (e.g., drift above) the defined voltage level (e.g., $V_{cmin}$). At desired times (e.g., at a desired rate and/or when the input voltage associated with the capacitive feedback amplifier component 314 is determined or detected to be at a voltage level that is above (or below) the defined voltage level (e.g., $V_{cmin}$) by a threshold voltage amount), the reset switch component 334 can be switched to a closed or on state to connect the input nodes of the capacitive feedback amplifier component 314 to the voltage source component 326 that can supply a voltage at the defined voltage level to adjust or reset the voltage level to, or at least substantially close to, the defined voltage level (e.g., $V_{cmin}$) at the input nodes of the capacitive feedback amplifier component 314. The reset switch component 334 can be switched to an open state after resetting or adjusting such voltage level to the defined voltage level. It is noted that, due in part to the input nodes of the capacitive feedback amplifier component 314 being desirably high ohmic points, the voltage level associated with the input nodes of the capacitive feedback amplifier component 314 desirably may not drift away from the defined voltage level by the threshold voltage amount and have to be reset to the defined voltage level very often, and the reset switch component 334 typically may only be closed at a desirably low (e.g., very low) rate to reset such voltage to the defined voltage level. While such switching of the reset switch component 334 can inject noise into the circuit of the C2V converter component 302, since such switching of the reset switch component 334 typically can be done at a desirably low rate, the amount of noise associated with such switching of the reset switch component 334 can be relatively minimal or negligible, and may not make any significant contribution to noise associated with the circuit of the C2V converter component 302.

The C2V converter component 302 can have more desirable (e.g., suitable, improved, increased, or optimal) suppression or rejection of noise and disturbance of or associated with the sensor drive component 332, as compared to existing C2V converters, and even over the C2V converter component 102 of FIG. 1. As compared to existing C2V converters, the C2V converter component 302 can have enhanced (e.g., improved, increased, or optimal) performance and reduced noise (e.g., reduced sensor drive noise and/or other noise) due in part to less amplification of operational amplifier (e.g., charge amplifier) noise of the capacitive feedback amplifier component 314 due in part to a relatively smaller amount of capacitance at the input nodes of the capacitive feedback amplifier component 314, which can be the result from the differential sensor component having two sensor components (e.g., 304 and 306) that can be half the size of a typical single sensor. Also, as compared to existing C2V converters, the C2V converter component 302 can have enhanced (e.g., improved, increased, or optimal) performance and reduced noise due in part to the noise of the ICMFB 316 desirably (e.g., suitably, enhancedly, or optimally) being able to be symmetrically injected and symmetrically loaded as a result of the symmetrical, or at least substantially symmetrical, structure of the C2V converter component 302 (e.g., symmetrical structure of the first and second sensor components 304 and 306 of the differential sensor component, and symmetrical structure of the first and second capacitive DAC components 310 and 312). Since the noise of the ICMFB 316 desirably can be symmetrically injected and symmetrically loaded, this can bring the ICMFB noise at common mode at the output of the capacitive feedback amplifier component 314, and accordingly, the C2V converter component 302, and such ICMFB noise can be rejected or suppressed, or at least substantially rejected or suppressed, by a succeeding capacitively coupled amplifier (not shown in FIG. 3).

For reasons similar to above, and due in part to the symmetrical, or at least substantially symmetrical, structure of the C2V converter component 302, the C2V converter component 302 desirably (e.g., suitably, enhancedly, or optimally) can have increased, and inherently and desirably good, PSRR towards the sensor drive component 332, as compared to existing C2V converters. The C2V converter component 302 also desirably can have increased reduction of rectification effects from RF components associated with the system 300 (e.g., increased reduction of rectification effects from RF components on the bond wire of the top electrode of the sensor drive component 332), as compared to existing C2V converters. The C2V converter component 302 also desirably can have improved or increased rejection or suppression of parasitic capacitances (e.g., parasitic capacitances 336, 338, and 340 (e.g., $C_{pt}$, $C_{pb1}$, and $C_{pb2}$) associated with the first and second sensor components 304 and 306, as compared to existing C2V converters. The symmetrical, or at least substantially symmetrical, structure of the C2V converter component 302 also desirably can result in the C2V converter component 302 being less sensitive to capacitive coupling in the circuit layout, as compared to existing C2V converters.

Further, the C2V converter component 302 can have a more desirable (e.g., suitable, improved, increased, or optimal) noise-current tradeoff than existing C2V converters. This can be due in part to the C2V converter component 302 having no noise folding, or at least substantially no noise folding, and the noise of the sensor drive component 332 being removed or at least substantially removed by the ICMFB 316, the ICMFB being purely capacitively coupled, wherein, as a result, the input nodes of the capacitive feedback amplifier component 314 can be desirably high ohmic. Further, in contrast to existing C2V converters, the C2V converter component 302 does not contain switching nodes, such as, for example, switch cap resistors or feedback resistors, at the input nodes of the capacitive feedback amplifier component 314 that can inject undesirable noise in the capacitive feedback amplifier component 314, and only has a reset switch component 334 that can be switched at a desirably low rate (e.g., on the order of seconds or tens of seconds) such that the reset switch component 334 only may contribute relatively minimal or negligible noise to the circuit of the C2V converter component 302. In certain embodiments, the performance (e.g., noise-current performance) improvement of the C2V converter component 302, employing the differential sensor component (e.g., employing the first and second sensor components 304 and 306), can be a factor of five or approximately five over existing dual drive C2V converters.

Figure 4:
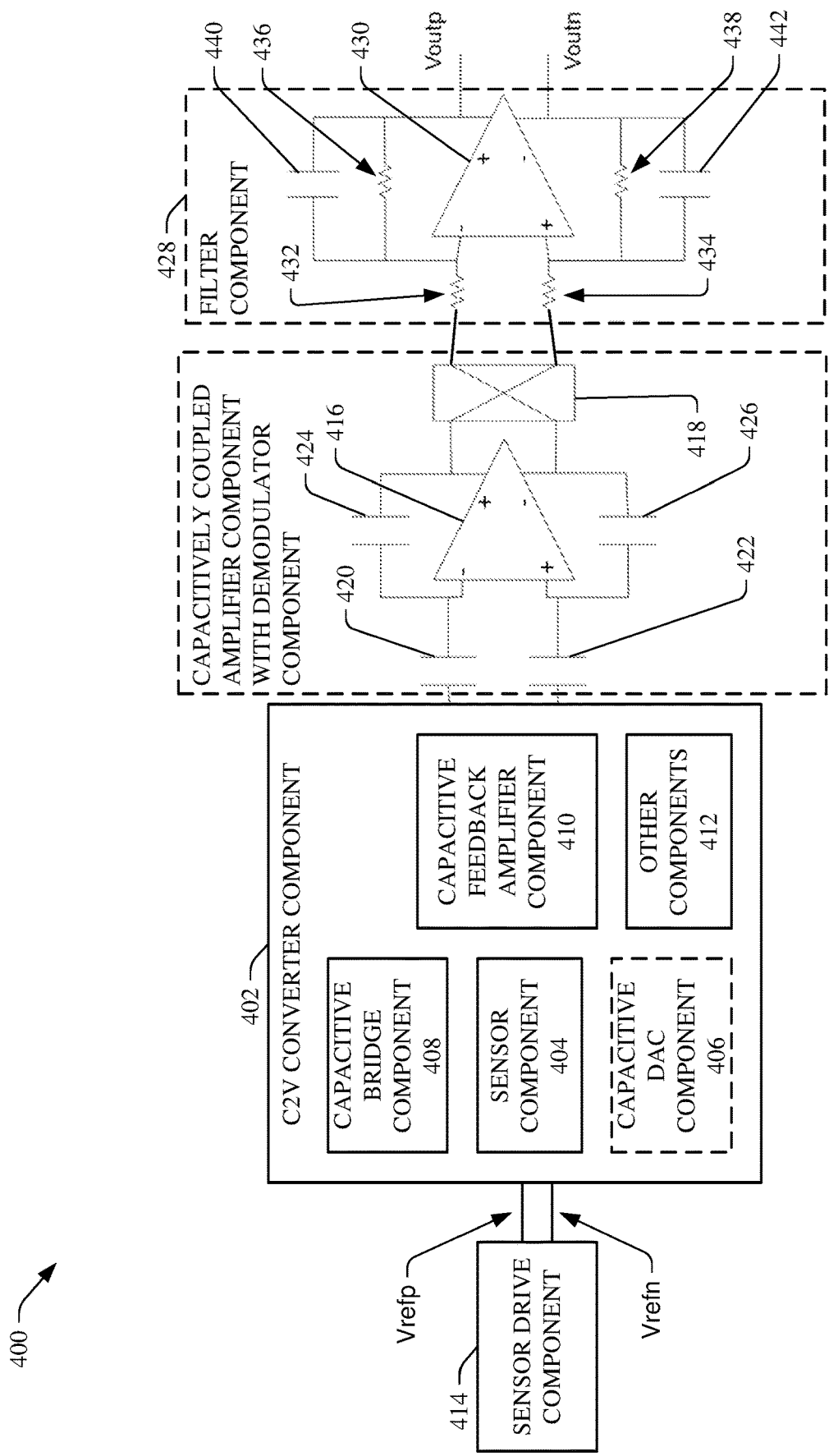
FIG. 4 illustrates a diagram of an example system that can comprise analog front end (AFE) circuitry that can include a C2V converter component, in accordance with various aspects and embodiments of the disclosed subject matter.

FIG. 4 illustrates a diagram of an example system 400 that can comprise AFE circuitry that can include a C2V converter component (e.g., single drive C2V converter component), in accordance with various aspects and embodiments of the disclosed subject matter. The system 400 can comprise, or can be used in connection with, a single sensor, a balanced single sensor, a differential sensor, a differential pressure sensor, an accelerometer or other motion sensor, a capacitive sensor, a capacitive antenna, and/or other types of sensors, components, or devices. In some implementations, the system 400 can be, can comprise, or can be used in connection with a MEMS or semiconductor sensor.

The system 400 can comprise a C2V converter component 402 that can comprise a sensor component 404, which can include a single sensor component, a balanced single sensor component, or a differential sensor component, such as described herein. In some embodiments, such as with regard to the single sensor implementation, the C2V converter component 402 can comprise a capacitive DAC component 406 that can be associated with the sensor component 404, such as described herein.

The C2V converter component 402 also can comprise a capacitive bridge component 408 that can be associated with (e.g., electronically connected to) the sensor component 404 and/or the capacitive DAC component 406, such as described herein. In accordance with various embodiments, the capacitive bridge component 408 can comprise respective capacitive DAC components that can be associated with the one or more sensors of the sensor component 404 and/or the capacitive DAC component 406, such as described herein.

The C2V converter component 402 further can comprise a capacitive feedback amplifier component 410 that can be associated with (e.g., electronically connected to) the sensor component 404, the capacitive bridge component 408, and/or the capacitive DAC component 406, such as described herein. The capacitive feedback amplifier component 410 can comprise a capacitively coupled ICMFB (e.g., ICMFB circuit, which can comprise an ICMFB amplifier component), an amplifier component, and OCMFB (e.g., OCMFB circuit), such as described herein. The C2V converter component 402 also can comprise other components 412 (e.g., coupling capacitors, feedback capacitors, reset switch component, and/or other components) that can be respectively associated with the sensor component 404, capacitive DAC component 406, capacitive bridge component 408, capacitive feedback amplifier component 410, and/or each other, such as described herein.

The system 400 also can comprise a sensor drive component 414 that can be associated with inputs of the C2V converter component 402. The sensor drive component 414 can generate reference signals, such as a first reference voltage signal (e.g., $V_{refp}$) and a second reference voltage signal (e.g., $V_{refn}$), that can be applied to the C2V converter component 402, such as described herein. Based at least in part on the first reference voltage signal and the second reference voltage signal input to the C2V converter component 402, the C2V converter component 402, via the output of the capacitive feedback amplifier component 410, can produce a differential voltage signal as an output, such as described herein.

In some embodiments, the system 400 can comprise a capacitively coupled amplifier component 416 and a demodulator component 418. A differential input of the capacitively coupled amplifier component 416 can be associated with (e.g., capacitively coupled to) the output of the C2V converter component 402, via a capacitor component 420 and a capacitor component 422. One end (e.g., plate or terminal) of the capacitor component 420 can be connected to the positive output terminal of the capacitive feedback amplifier component 410, and the other end of the capacitor component 420 can be connected to a negative input terminal of the capacitively coupled amplifier component 416. Also, one end (e.g., plate or terminal) of the capacitor component 422 can be connected to the negative output terminal of the capacitive feedback amplifier component 410, and the other end of the capacitor component 422 can be connected to a positive input terminal of the capacitively coupled amplifier component 416. The capacitively coupled amplifier component 416 can receive, via its differential input, the common mode or differential voltage signal output from the capacitive feedback amplifier component 410. Feedback capacitor components 424 and 426 can be associated with respective input terminals and respective output terminals of the capacitively coupled amplifier component 416. For instance, one terminal of the feedback capacitor component 424 can be connected to the negative input terminal of the capacitively coupled amplifier component 416, and the other terminal of the feedback capacitor component 424 can be connected to the positive output terminal of the capacitively coupled amplifier component 416. Also, one terminal of the feedback capacitor component 426 can be connected to the positive input terminal of the capacitively coupled amplifier component 416, and the other terminal of the feedback capacitor component 426 can be connected to the negative output terminal of the capacitively coupled amplifier component 416.

The capacitively coupled amplifier component 416 can comprise a differential output and can generate and output, via its differential output, a differential output voltage signal that can have a voltage level that can be based at least in part on the common mode or differential voltage signal output received from the capacitive feedback amplifier component 410 and a gain level of the capacitively coupled amplifier component 416.

The demodulator component 418 can receive the differential output voltage signal from the capacitively coupled amplifier component 416, and can demodulate the differential output voltage signal received from the capacitively coupled amplifier component 416 to generate (e.g., produce) a demodulated signal as an output from the demodulator component 418. For example, the differential voltage signal output from the C2V converter component 402 can be an alternating current (AC) voltage signal, and accordingly, the differential output voltage signal output from the capacitively coupled amplifier component 416 can be an AC voltage signal; and it can be desired to convert that AC voltage signal to a direct current (DC) voltage signal. The demodulator component 418 can process, condition, or demodulate the differential output voltage signal to convert that AC voltage signal to a desired DC voltage signal, which can be the demodulated signal, that can be on or can have the same frequency as the reference voltages (e.g., $V_{refp}$ and $V_{refn}$) that were input or applied to the C2V converter component 402.

In certain embodiments, the system 400 can comprise a filter component 428, which can be an active resistor-capacitor (RC) filter that can desirably filter the demodulated signal that can be received from the demodulator component 418 and can generate a filtered voltage signal (e.g., a filtered differential voltage signal, such as $V_{outp}$ and $V_{outn}$) as an output. The filter component 428 can filter out undesired noise or interference from the demodulated signal, and/or process (e.g., smooth out) the voltage level and/or current level of the demodulated signal, and/or otherwise improve the quality of the demodulated signal.

In some embodiments, the filter component 428 can comprise an amplifier component 430 that can receive, at its differential input, the demodulated signal, via resistor components 432 and 434, which can be respectively associated with (e.g., connected to) the input terminals of the amplifier component 430. In some embodiments, the filter component 428, via the amplifier component 430, also can apply a desired amount of gain to the demodulated signal, wherein the amount of gain typically can be relatively small. The filter component 428 also can comprise resistor components 436 and 438, and capacitor components 440 and 442. The resistor component 436 and capacitor component 440 can be connected in parallel, and their respective terminals can be connected to an input terminal (e.g., negative input terminal) of the amplifier component 430 and an output terminal (e.g., positive output terminal) of the amplifier component 430. The resistor component 438 and capacitor component 442 also can be connected in parallel, and their respective terminals can be connected to the other input terminal (e.g., positive input terminal) of the amplifier component 430 and the other output terminal (e.g., negative output terminal) of the amplifier component 430.

The filtered voltage signal (e.g., $V_{outp}$ and $V_{outn}$) can be provided (e.g., supplied or applied) to other electronic components (e.g., one or more other amplifier components, or other type of electronic component) of a device, as desired.

Figure 5:
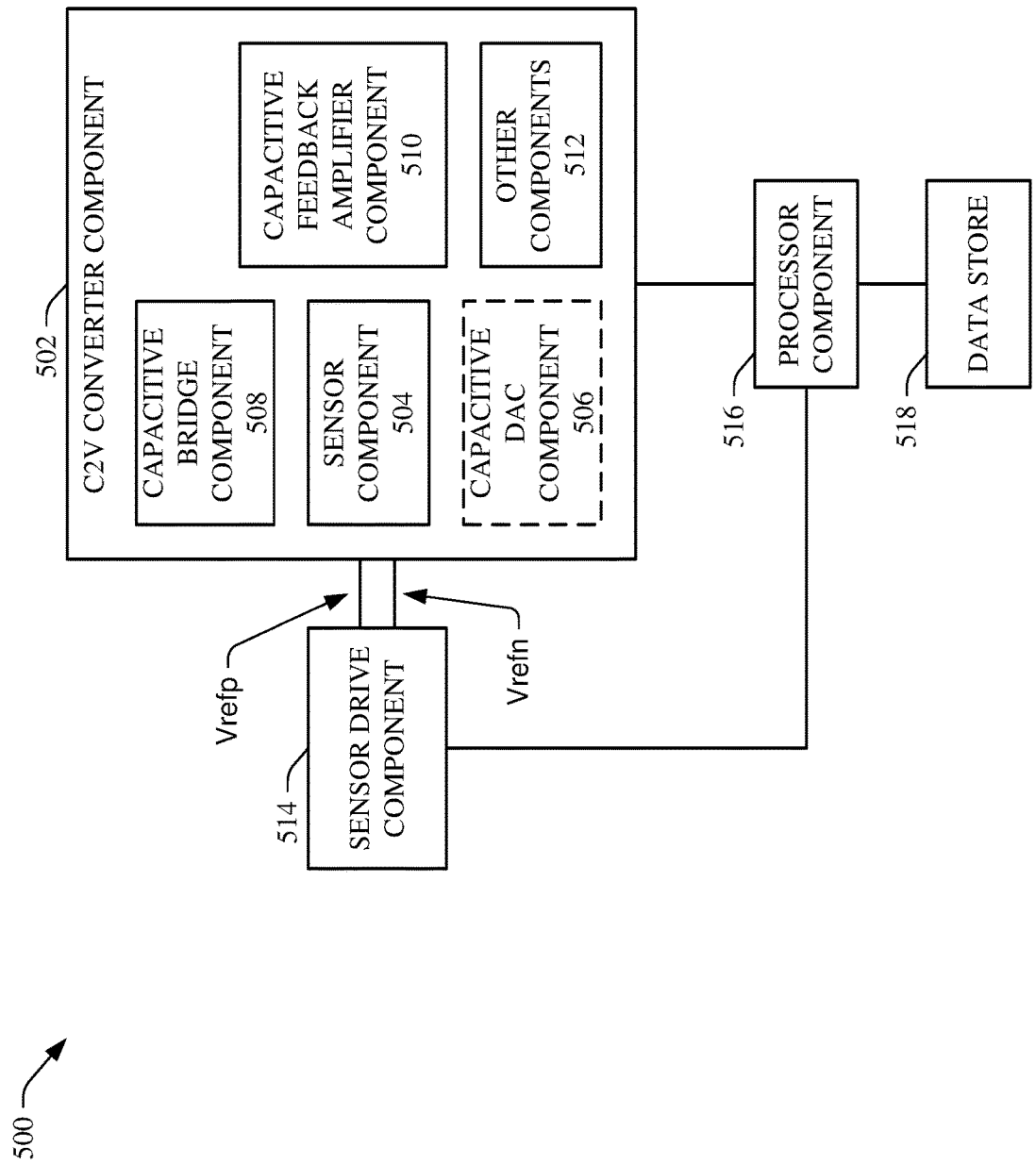
FIG. 5 illustrates a block diagram of an example system that can comprise a C2V converter component that can comprise programmable or adjustable electronic components, in accordance with various aspects and embodiments of the disclosed subject matter.

FIG. 5 illustrates a block diagram of an example system 500 that can comprise a C2V converter component (e.g., single drive C2V converter component) that can comprise programmable or adjustable electronic components, in accordance with various aspects and embodiments of the disclosed subject matter. The system 500 can comprise a C2V converter component 502 that can comprise a sensor component 504, which can include a single sensor component, a balanced single sensor component, or a differential sensor component, such as described herein. In some embodiments, such as with regard to the single sensor implementation, the C2V converter component 502 can comprise a capacitive DAC component 506 that can be associated with (e.g., electronically connected to) the sensor component 504, such as described herein.

The C2V converter component 502 also can comprise a capacitive bridge component 508 that can be associated with (e.g., electronically connected to) the sensor component 504 and/or the capacitive DAC component 506, such as described herein. In accordance with various embodiments, the capacitive bridge component 508 can comprise respective capacitive DAC components that can be associated with the one or more sensors of the sensor component 504 and/or the capacitive DAC component 506, such as described herein.

The C2V converter component 502 further can comprise a capacitive feedback amplifier component 510 that can be associated with the sensor component 504, the capacitive bridge component 508, and/or the capacitive DAC component 506, such as described herein. The capacitive feedback amplifier component 510 can comprise a capacitively coupled ICMFB (e.g., ICMFB circuit, which can comprise an ICMFB amplifier component), an amplifier component, and OCMFB (e.g., OCMFB circuit), such as described herein. The C2V converter component 502 also can comprise other components 512 (e.g., coupling capacitors, feedback capacitors, reset switch component, and/or other components) that can be respectively associated with the sensor component 504, capacitive DAC component 506, capacitive bridge component 508, capacitive feedback amplifier component 510, and/or each other, such as described herein.

The system 500 also can comprise a sensor drive component 514 that can be associated with inputs of the C2V converter component 502. The sensor drive component 514 can generate reference signals, such as a first reference voltage signal (e.g., $V_{refp}$) and a second reference voltage signal (e.g., $V_{refn}$), that can be applied to the C2V converter component 502, such as described herein. Based at least in part on the first reference voltage signal and the second reference voltage signal input to the C2V converter component 502, the C2V converter component 502, via the output of the capacitive feedback amplifier component 510, can produce a differential voltage signal as an output, such as described herein.

In accordance with various embodiments, certain electronic components of or associated with the C2V converter component 502, such as, for example, the capacitive DAC component 506, the capacitive DAC components of the capacitive bridge component 508, the capacitive feedback amplifier component 510 (e.g., amplifier component, ICMFB amplifier component, and/or OCMFB), feedback capacitors (e.g., feedback capacitor components associated with the capacitive feedback amplifier component 510), the sensor drive component 514, the voltage source component that provides or facilitate providing a desired voltage level, such as $V_{cmin}$, to facilitate performing a reset via the reset switch component and/or controlling the voltage level of the common mode component at the negative (−) input and/or the positive (+) input of the amplifier component of the capacitive feedback amplifier component 510 (e.g., as regulated using the capacitively coupled ICMFB), and/or other electronic components can be programmable or adjustable. In some embodiments, to facilitate programming or adjusting respective parameters values of respective electronic components (e.g., capacitive DAC component 506, capacitive bridge component 508, capacitive feedback amplifier component 510, feedback capacitors, sensor drive component 514, and/or other electronic components) of or associated with the C2V converter component 502, the system 500 can comprise a processor component 516 that can control (e.g., manage), program, or adjust the respective parameter values of the respective electronic components of or associated with the C2V converter component 502, in accordance with defined signal processing criteria relating to processing (e.g., controlling, adjusting, amplifying, converting, filtering, or otherwise processing) of signals (e.g., voltage and current signals) of or associated with the system 500. The system 500 also can comprise a data store 518 that can be associated with (e.g., electronically connected to or integrated with) the processor component 516 to facilitate the controlling, programming, or adjusting the respective parameter values of the respective electronic components of or associated with the C2V converter component 502.

For example, if the sensor component 504 is a single sensor, the processor component 516 can program, set, or adjust a capacitance value of the capacitive DAC component 506 to be same as or substantially the same as a capacitance value of the sensor component 504. If the single sensor of the sensor component 504 is a pressure sensor, this programmed capacitance value of the capacitive DAC component 506 can represent or act as a desired reference pressure value, and also, by being the same or substantially the same as the capacitance value of the sensor component 504, can desirably (e.g., suitably, enhancedly, or optimally) balance out that circuit portion, comprising the sensor component 504 and the capacitive DAC component 506.

As another example, the processor component 516 can program, set, or adjust respective capacitance values of the respective capacitive DAC components of the capacitive bridge component 508. For instance, the processor component 516 can program, set, or adjust respective capacitance values of the respective capacitive DAC components of the capacitive bridge component 508 such that their capacitance values can be the same or substantially the same. This can facilitate desirably (e.g., suitably, enhancedly, or optimally) balancing the circuit of the system 500.

As still another example, the processor component 516 can program, set, or adjust respective gain levels of the amplifier component and/or ICMFB (e.g., capacitively coupled ICMFB amplifier component) of the capacitive feedback amplifier component 510. For instance, the processor component 516 can program, set, or adjust respective gain levels of the amplifier component and/or ICMFB to be at respective desired (e.g., wanted, suitable, or optimal) gain levels that can be 1.0 or greater than 1.0.

In accordance with various embodiments, the processor component 516 can manage (e.g., control) the reset switch component (e.g., such as described herein) situated at the input nodes of the capacitive feedback amplifier component 510 of the C2V converter component 502 to have the reset switch component transition from an open or off state to a closed or on state in response to occurrence of an event or at a desired (e.g., fixed and relatively low, wanted, and/or optimal) repetition rate. For instance, the processor component 516 can determine or detect whether a voltage level associated with the input common mode of the capacitive feedback amplifier component 510 has satisfied a defined threshold voltage level (e.g., is above (e.g., has drifted above) a defined higher threshold voltage level, or is below (e.g., has drifted below) a defined lower threshold voltage level), and if the processor component 516 determines or detects that the voltage level associated with the input common mode has satisfied the defined threshold voltage level, the processor component 516 can communicate a reset signal (e.g., a reset pulse) to the reset switch component to transition (e.g., switch) the reset switch component from the open or off state to the closed or on state (e.g., for a relatively short or momentary amount of time to change (e.g., reduce or increase) the voltage level associated with the input common mode such that it is within the desired threshold voltage level range). Additionally or alternatively, the processor component 516 communicate the reset signal to the reset switch component at the desired repetition rate to transition the reset switch component from the open or off state to the closed or on state (e.g., for a relatively short or momentary amount of time to change (e.g., reduce or increase) the voltage level associated with the input common mode to facilitate adjusting or maintaining that voltage level to be within the desired threshold voltage level range).

With regard to an event-based (e.g., event triggered) reset (e.g., by applying a reset pulse to the reset switch component in response to occurrence or detection of an event), due to the structure of the C2V converter component 502 (e.g., the C2V converter components of the disclosed subject matter), an event, such as the input common mode of the capacitive feedback amplifier component 510 satisfying the defined threshold voltage level, may only occur on a relatively infrequent basis (e.g., at a much lower basis, such as on the order of seconds) relative to (e.g., as compared to) the switching frequency of the C2V converter component 502. Accordingly, the processor component 516 typically may only communicate the reset signal relatively infrequently in response to an event (e.g., due to a threshold voltage level being determined to be satisfied). With regard to performing the reset, by applying reset pulses to the reset switch component at a desired (e.g., defined or fixed) repetition rate. (e.g., to switch the reset switch component from the open or off state to the closed or on state), the desired repetition rate of performing such reset, utilizing the reset switch component, can be a relatively low and fixed repetition rate that can be significantly lower that the switching frequency of the C2V converter component 502. As a result, with regard to the event-based reset or the reset performed at the desired repetition rate, there typically only may be a relatively small amount of noise contribution associated with the transitioning of the reset switch component between the open or off state and the closed or on state, wherein such relatively small amount of noise associated with the transitioning of the reset switch component can be significantly (e.g., much) smaller than the overall amount of noise (which itself also can be relatively small) associated with the C2V converter component 502.

In certain embodiments, the processor component 516 can program, set, or adjust the defined voltage level (e.g., $V_{cmin}$, which can be minimum $V_c$ level associated with the system 500) associated with the reset switch component to facilitate making determinations regarding whether a reset (e.g., switching from the open or off state to the closed or on state) of the reset switch component is to be performed and/or facilitate adjusting the voltage level associated with the input common mode (e.g., adjusting such voltage level to or towards the defined voltage level) of the capacitive feedback amplifier component 510.

As yet another example, the processor component 516 can program, set, or adjust the respective capacitance levels of the respective feedback capacitors associated with the capacitive feedback amplifier component 510 of the C2V converter component 502. For instance, the processor component 516 can program, set, or adjust the respective capacitance levels of the respective feedback capacitors such that their capacitance levels can be the same or substantially the same and can be at a desired capacitance level relative to other parameter values of other electronic components of or associated with the C2V converter component 502.

With further regard to the processor component 516, the processor component 516 can work in conjunction with the other components (e.g., capacitive DAC component 506, capacitive bridge component 508, feedback capacitors, sensor drive component 514, data store 518, and/or other components) to facilitate performing the various functions of the system 500. The processor component 516 can employ one or more processors, microprocessors, controllers, or microcontrollers that can process data, such as information relating to respective parameter values of certain of the respective electronic components of the system 500, code, policies and rules, the defined signal processing criteria, traffic flows, signaling, algorithms (e.g., C2V converter management algorithms, or other algorithms, as disclosed, defined, recited, or indicated herein by the methods, systems, and techniques described herein), protocols, interfaces, tools, and/or other information, to facilitate operation of the system 500, as more fully disclosed herein, and control data or signal flow between the respective electronic components of the system 500, and/or between the electronic components of the system 500 and other electronic components or devices (e.g., amplifier component(s), devices, or other components) associated with the system 500, and/or between the electronic components of the system 500 and applications associated with the system 500.

With further regard to the data store 518, the data store 518 can store data structures (e.g., user data, metadata), code structure(s) (e.g., modules, objects, hashes, classes, procedures) or instructions, information relating to the respective parameter values of certain of the respective electronic components of the system 500, code, policies and rules, the defined signal processing criteria, traffic flows, signaling, algorithms (e.g., C2V converter management algorithms, or other algorithms, as disclosed, defined, recited, or indicated herein by the methods, systems, and techniques described herein), protocols, interfaces, tools, and/or other information, to facilitate controlling operations associated with the system 500. In an aspect, the processor component 516 can be functionally coupled (e.g., through a memory bus) to the data store 518 in order to store and retrieve information desired to operate and/or confer functionality, at least in part, to the system 500 and its components, and the data store 518, and/or substantially any other operational aspects of the system 500.

It should be appreciated that the data store 518 can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

In accordance with various embodiments, a system (e.g., system 100, system 200, system 300, system 400, system 500, or other system) as disclosed herein, electronic components of such system, and/or one or more other electronic components or other systems associated with such system, and/or electronic circuitry relating thereto, can be formed in or on one or more integrated circuits (IC), one or more IC chips, and/or one or more dies. For example, such a system as disclosed herein can be formed on a single die, or portions of such system can be formed on a desired number of dies that can be associated with (e.g., electrically connected) to each other. In some embodiments, such a system as disclosed herein, or a desired portion thereof, can be, can comprise, and/or can be formed as or part of an application-specific IC (ASIC).

The aforementioned devices and/or systems have been described with respect to interaction between several components. It should be appreciated that such systems and components can include those components or sub-components specified therein, some of the specified components or sub-components, and/or additional components. Sub-components could also be implemented as components coupled to and/or communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 6:
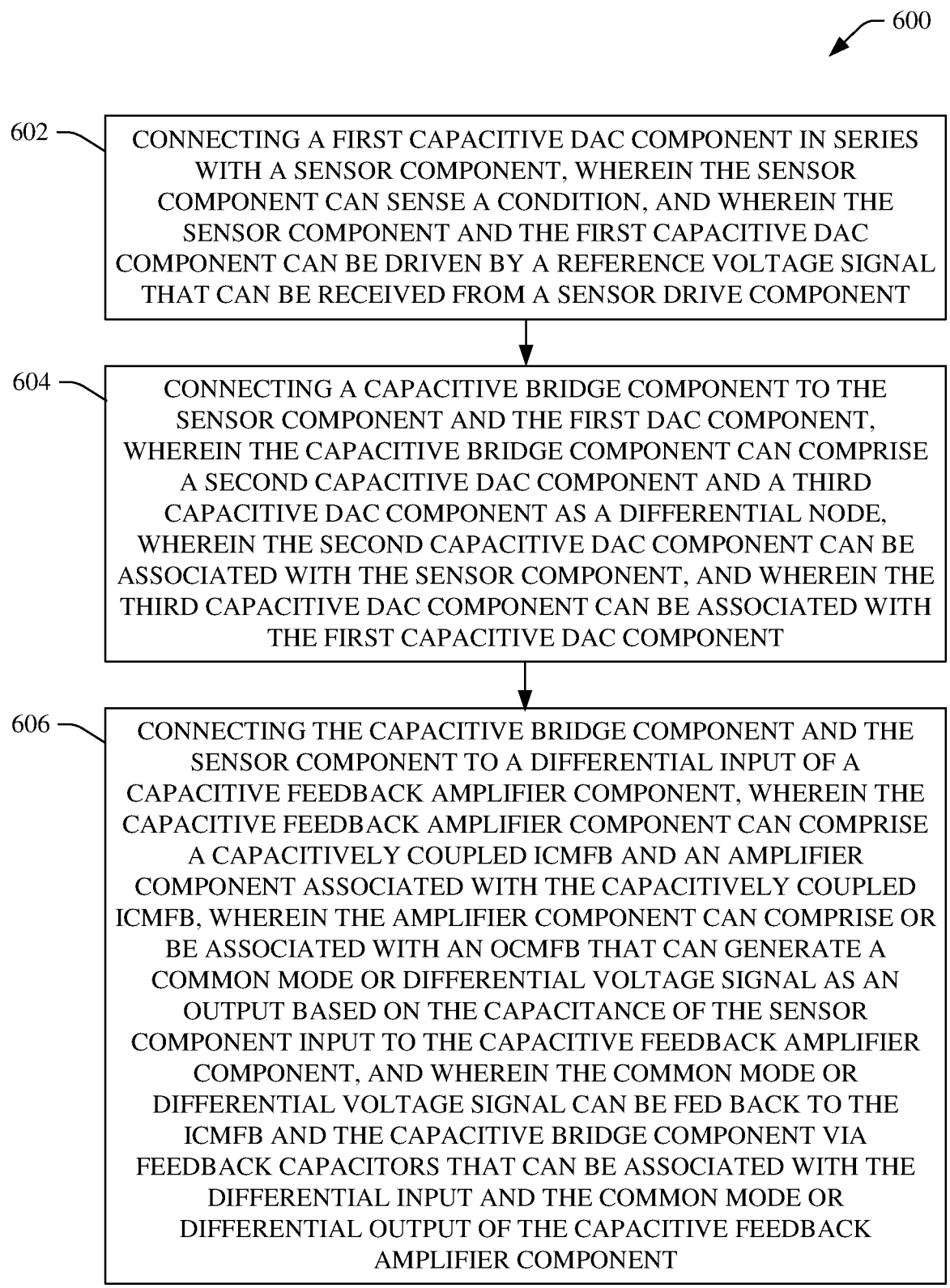
FIG. 6 illustrates a flow diagram of an example method that can form a single drive C2V converter component comprising a single sensor component, in accordance with various aspects and embodiments of the disclosed subject matter.
Figure 7:
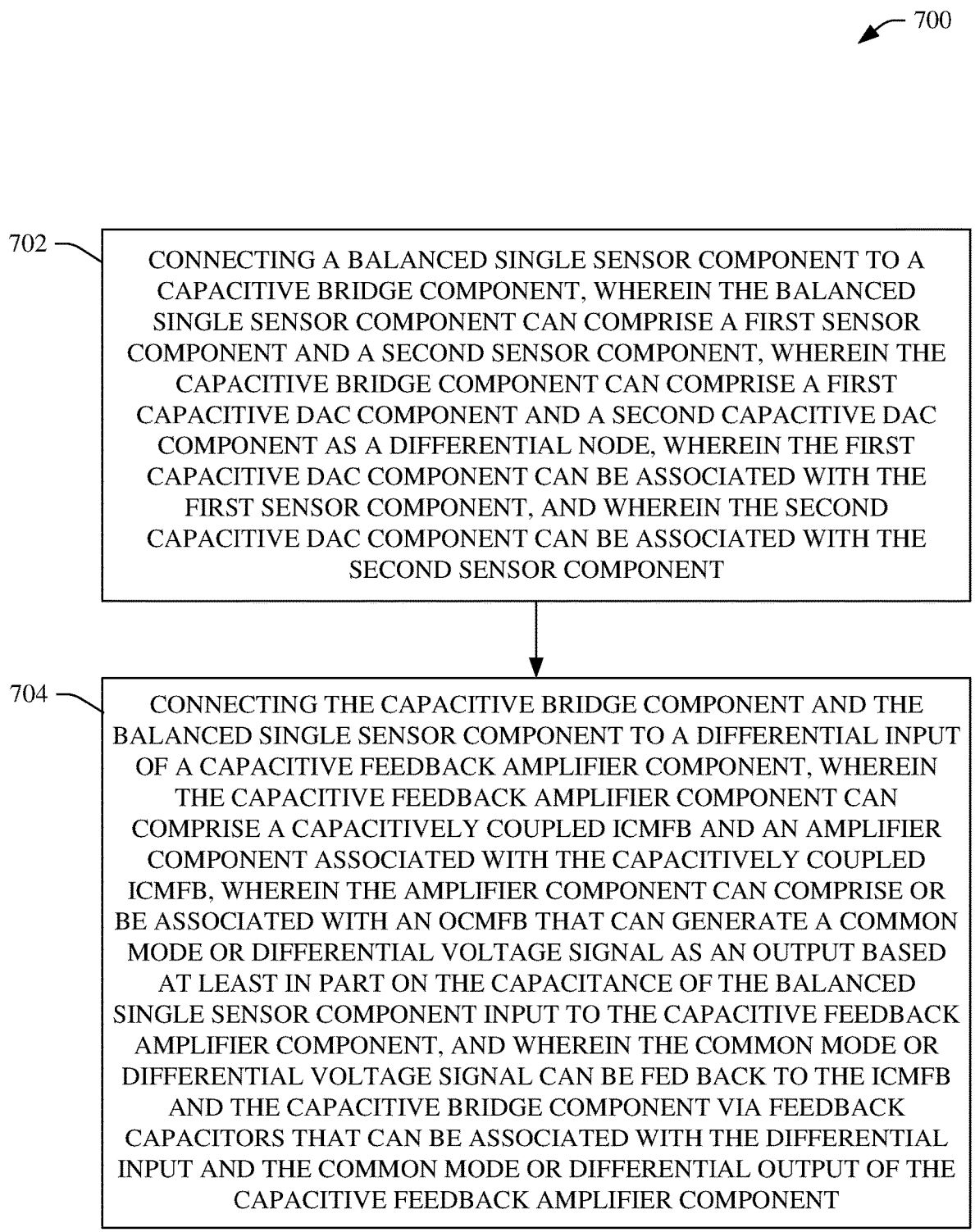
FIG. 7 depicts a flow diagram of an example method that can form a single drive C2V converter component comprising a balanced single sensor component, in accordance with various aspects and embodiments of the disclosed subject matter.
Figure 8:
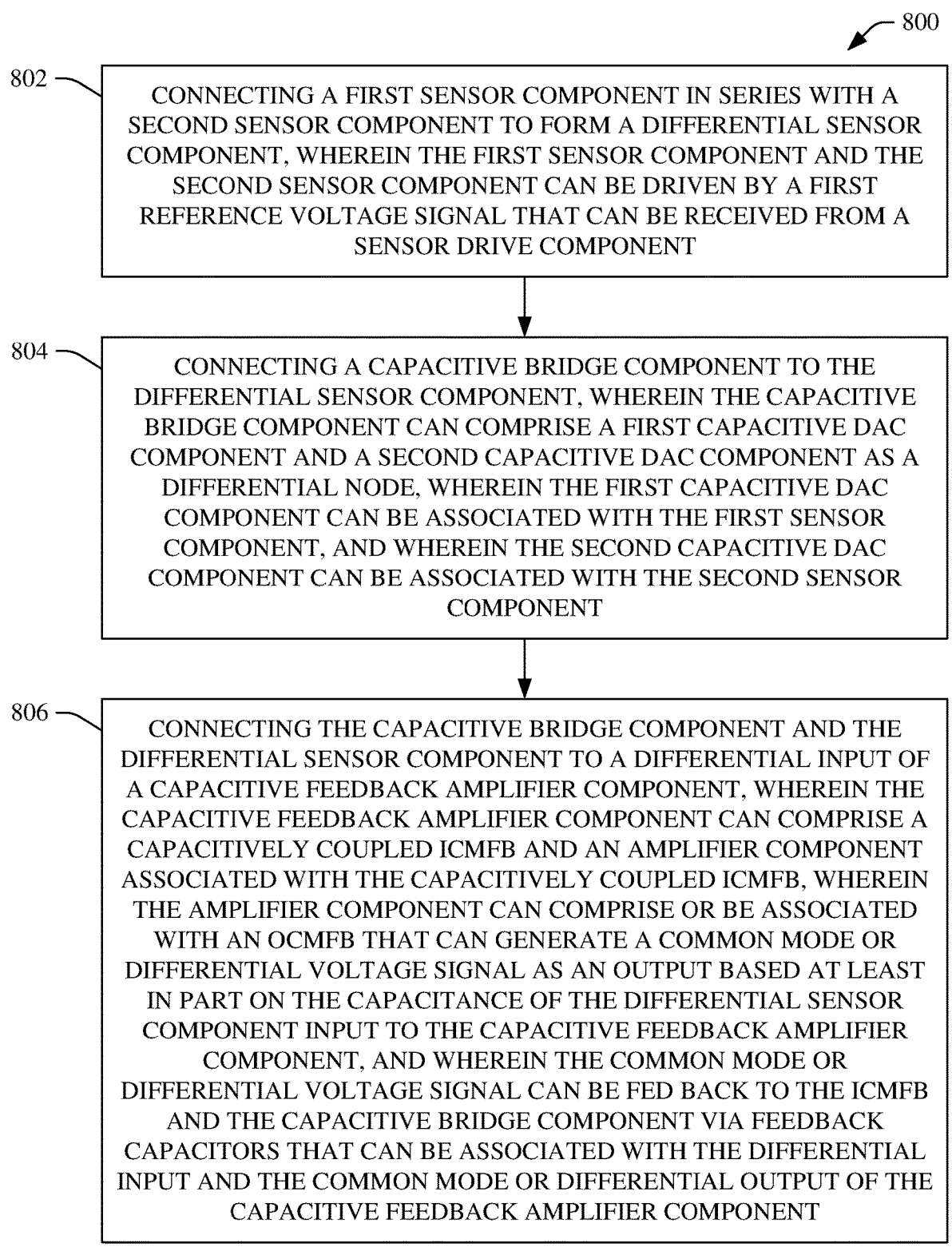
FIG. 8 depicts a flow diagram of an example method that can form a single drive C2V converter component comprising a differential sensor component, in accordance with various aspects and embodiments of the disclosed subject matter.

In view of the example systems and/or devices described herein, example methods that can be implemented in accordance with the disclosed subject matter can be further appreciated with reference to flowchart in FIGS. 6-8. FIGS. 6-8 illustrate methods and/or flow diagrams in accordance with the disclosed subject matter. For simplicity of explanation, the methods are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter.

Referring to FIG. 6, illustrated is a flow diagram of an example method 600 that can form (e.g., create or generate) a single drive C2V converter component comprising a single sensor component, in accordance with various aspects and embodiments of the disclosed subject matter. The method 600 can be implemented, for example, by or utilizing a system or device comprising the single sensor component, and/or a processor and associated memory (e.g., data store), wherein the processor can control or facilitate controlling formation, fabrication, or operation of the C2V converter component.

At 602, a first capacitive DAC component can be connected in series with a sensor component, wherein the sensor component can sense a condition, and wherein the sensor component and the first capacitive DAC component can be driven by a reference voltage signal that can be received from a sensor drive component. The first capacitive DAC can facilitate removal of a base capacitance value of a capacitance of the sensor component.

At 604, a capacitive bridge component can be connected to the sensor component and the first DAC component, wherein the capacitive bridge component can comprise a second capacitive DAC component and a third capacitive DAC component as a differential node, wherein the second capacitive DAC component can be associated with (e.g., connected to) the sensor component, and wherein the third capacitive DAC component can be associated with the first capacitive DAC component, such as described herein. The capacitive bridge component can be driven by another reference voltage signal that can be received from the sensor drive component.

At 606, the capacitive bridge component and the sensor component can be connected to a differential input of a capacitive feedback amplifier component, wherein the capacitive feedback amplifier component can comprise a capacitively coupled ICMFB and an amplifier component associated with the capacitively coupled ICMFB, wherein the amplifier component can comprise or be associated with an OCMFB that can generate a common mode or differential voltage signal as an output based at least in part on the capacitance of the sensor component input to the capacitive feedback amplifier component, and wherein the common mode or differential voltage signal can be fed back to the ICMFB and the capacitive bridge component via feedback capacitors that can be associated with the differential input and the common mode or differential output of the capacitive feedback amplifier component, such as described herein. For instance, the feedback capacitors, respectively, at one end (e.g., terminal or plate) of the feedback capacitors, can be associated with the common mode or differential output of the capacitive feedback amplifier component, and, at their other end, can be associated with the differential input of the capacitive feedback amplifier component and the capacitor bridge component. In some embodiments, the capacitive feedback amplifier component can be a continuous time AFE amplifier with no signal sampling and no noise folding, or at least substantially no noise folding, such as described herein.

FIG. 7 depicts a flow diagram of an example method 700 that can form a single drive C2V converter component comprising a balanced single sensor component, in accordance with various aspects and embodiments of the disclosed subject matter. The method 700 can be implemented, for example, by or utilizing a system or device comprising the balanced single sensor component, and/or a processor and associated memory (e.g., data store), wherein the processor can control or facilitate controlling formation, fabrication, or operation of the C2V converter component.

At 702, a balanced single sensor component can be connected to a capacitive bridge component, wherein the balanced single sensor component can comprise a first sensor component and a second sensor component, wherein the capacitive bridge component can comprise a first capacitive DAC component and a second capacitive DAC component as a differential node, wherein the first capacitive DAC component can be associated with the first sensor component, and wherein the second capacitive DAC component can be associated with the second sensor component. The first sensor component and the second sensor component can be the same or at least substantially the same, and together can form the balanced single sensor component on a same sensor die. In some embodiments, the first sensor component and the second sensor component can be half or approximately half of the size of a single sensor. The balanced single sensor component can sense a condition, such as pressure (e.g., air pressure, touch pressure, or other pressure) or another desired type of condition. The first sensor component and the second capacitive DAC component can be driven by a first reference voltage signal that can be received from a sensor drive component. The second sensor component and the first capacitive DAC component can be driven by a second reference voltage signal that can be received from the sensor drive component.

At 704, the capacitive bridge component and the balanced single sensor component can be connected to a differential input of a capacitive feedback amplifier component, wherein the capacitive feedback amplifier component can comprise a capacitively coupled ICMFB and an amplifier component associated with the capacitively coupled ICMFB, wherein the amplifier component can comprise or be associated with an OCMFB that can generate a common mode or differential voltage signal as an output based at least in part on the capacitance of the balanced single sensor component input to the capacitive feedback amplifier component, and wherein the common mode or differential voltage signal can be fed back to the ICMFB and the capacitive bridge component via feedback capacitors that can be associated with the differential input and the common mode or differential output of the capacitive feedback amplifier component, such as described herein. For instance, the feedback capacitors, respectively, at one end (e.g., terminal or plate) of the feedback capacitors, can be associated with the common mode or differential output of the capacitive feedback amplifier component, and, at their other end, can be associated with the differential input of the capacitive feedback amplifier component and the capacitor bridge component. In some embodiments, the capacitive feedback amplifier component can be a continuous time AFE amplifier with no signal sampling and no noise folding, or at least substantially no noise folding, such as described herein.

Turning to FIG. 8, depicted is a flow diagram of an example method 800 that can form a single drive C2V converter component comprising a differential sensor component, in accordance with various aspects and embodiments of the disclosed subject matter. The method 800 can be implemented, for example, by or utilizing a system or device comprising the differential sensor component, and/or a processor and associated memory (e.g., data store), wherein the processor can control or facilitate controlling formation, fabrication, or operation of the C2V converter component.

At 802, a first sensor component can be connected in series with a second sensor component to form a differential sensor component, wherein the first sensor component and the second sensor component can be driven by a first reference voltage signal that can be received from a sensor drive component. In some embodiments, the differential sensor component can sense a condition, such as motion or acceleration associated with the differential sensor component.

At 804, a capacitive bridge component can be connected to the differential sensor component, wherein the capacitive bridge component can comprise a first capacitive DAC component and a second capacitive DAC component as a differential node, wherein the first capacitive DAC component can be associated with the first sensor component, and wherein the second capacitive DAC component can be associated with the second sensor component. The capacitive bridge component can be driven by a second reference voltage signal that can be received from the sensor drive component.

At 806, the capacitive bridge component and the differential sensor component can be connected to a differential input of a capacitive feedback amplifier component, wherein the capacitive feedback amplifier component can comprise a capacitively coupled ICMFB and an amplifier component associated with the capacitively coupled ICMFB, wherein the amplifier component can comprise or be associated with an OCMFB that can generate a common mode or differential voltage signal as an output based at least in part on the capacitance of the differential sensor component input to the capacitive feedback amplifier component, and wherein the common mode or differential voltage signal can be fed back to the ICMFB and the capacitive bridge component via feedback capacitors that can be associated with the differential input and the common mode or differential output of the capacitive feedback amplifier component, such as described herein. For instance, the feedback capacitors, respectively, at one end (e.g., terminal or plate) of the feedback capacitors, can be associated with the common mode or differential output of the capacitive feedback amplifier component, and, at their other end, can be associated with the differential input of the capacitive feedback amplifier component and the capacitor bridge component. In some embodiments, the capacitive feedback amplifier component can be a continuous time AFE amplifier with no signal sampling and no noise folding, or at least substantially no noise folding, such as described herein.

It is to be appreciated and understood that components (e.g., capacitive-to-voltage (C2V) converter component, sensor component, balanced single sensor component, differential sensor component, capacitive DAC component, capacitive bridge component, capacitive feedback amplifier component, amplifier component, ICMFB, OCMFB, feedback capacitor component, sensor drive component, demodulator component, active RC filter component, or other component), as described with regard to a particular device, system, or method, can comprise the same or similar functionality as respective components (e.g., respectively named components or similarly named components) as described with regard to other devices, systems, or methods disclosed herein.

Although the description has been provided with respect to particular embodiments thereof, these particular embodiments are merely illustrative and not restrictive.

While particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As used in this application, the terms "component," "system," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

What has been described above includes examples of aspects of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
    a sensor component that senses a condition;
    a first capacitive digital-to-analog-converter component that is connected in series with the sensor component, and facilitates removal of a base capacitance value of a capacitance of the sensor component, wherein the sensor component and the first capacitive digital-to-analog-converter component are driven by a reference voltage signal received from a sensor drive component; and
    a capacitive bridge component comprising a second capacitive digital-to-analog-converter component and a third capacitive digital-to-analog-converter component as a differential node, wherein the second capacitive digital-to-analog-converter component is connected to the sensor component, and the third capacitive digital-to-analog-converter component is connected to the first capacitive digital-to-analog-converter component.

2. The system of claim 1, further comprising a capacitive feedback amplifier component, wherein the capacitive bridge component is connected to a differential input of the capacitive feedback amplifier component.

3. The system of claim 2, further comprising a continuous-time single-drive capacitance-to-voltage converter comprising the sensor component, the first capacitive digital-to-analog-converter component, the capacitive bridge component, and the capacitive feedback amplifier component, wherein the continuous-time single-drive capacitanceto-voltage converter converts the capacitance of the sensor component to a voltage signal.

4. The system of claim 2, wherein a gain of the capacitive feedback amplifier component is programmable.

5. The system of claim 2, wherein the capacitive feedback amplifier component is a continuous amplifier, wherein no sampling is performed, and wherein noise is not folded back to the sensor component.

6. The system of claim 2, wherein the capacitive feedback amplifier component comprises a capacitively coupled input common mode feedback, wherein the capacitively coupled input common mode feedback sets an input common mode for the capacitive feedback amplifier component, and wherein the capacitively coupled input common mode feedback removes or suppresses noise from or associated with the sensor drive component.

7. The system of claim 6, wherein the capacitive feedback amplifier component comprises an output common mode feedback that generates a common mode voltage signal as an output based at least in part on the capacitance of the sensor component input to the capacitive feedback amplifier component, and wherein the common mode voltage signal is fed back to the bridge component.

8. The system of claim 1, wherein the reference voltage signal is a first reference voltage signal, and wherein the second capacitive digital-to-analog-converter component and the third capacitive digital-to-analog-converter component are driven by a second reference voltage signal received from the sensor drive component.

9. The system of claim 1, wherein the sensor component is at least one of a micro-electromechanical systems (MEMS) sensor component, a pressure sensor, or a single-ended capacitive sensor.

10. A device, comprising:
a first sensor component and a second sensor component that sense a condition; and
a capacitive bridge component comprising a first capacitive digital-to-analog-converter component and a second capacitive digital-to-analog-converter component that constitute a differential node, wherein the first capacitive digital-to-analog-converter component is connected to the first sensor component, and the second capacitive digital-to-analog-converter component is connected to the second sensor component, and wherein at least the first sensor component is driven by a reference voltage signal received from a sensor drive component.

11. The device of claim 10, further comprising a capacitive feedback amplifier component, wherein the capacitive bridge component is connected to a differential input of the capacitive feedback amplifier component, and wherein a gain of the capacitive feedback amplifier component is programmable.

12. The device of claim 11, further comprising a continuous-time single-drive capacitance-to-voltage converter comprising the first sensor component, the second sensor component, the capacitive bridge component, and the capacitive feedback amplifier component, wherein the continuous-time single-drive capacitance-to-voltage converter converts at least one of a first capacitance of the first sensor component or a second capacitance of the second sensor component to a voltage signal.

13. The device of claim 11, wherein the capacitive feedback amplifier component is a continuous amplifier, wherein no sampling is performed, and wherein noise is not folded back to the sensor component.

14. The device of claim 11, wherein the capacitive feedback amplifier component comprises a capacitively coupled input common mode feedback, wherein the capacitively coupled input common mode feedback sets an input common mode for the capacitive feedback amplifier component, and wherein the capacitively coupled input common mode feedback removes or suppresses noise from or associated with the sensor drive component.

15. The device of claim 14, wherein the capacitive feedback amplifier component comprises an output common mode feedback that generates a common mode voltage signal as an output based at least in part on at least one of a first capacitance of the first sensor component or a second capacitance of the second sensor component that is or are input to the capacitive feedback amplifier component, and wherein the common mode voltage signal is fed back to the bridge component.

16. The device of claim 10, further comprising a balanced single sensor component, comprising the first sensor component and the second sensor component, wherein the reference voltage signal is a first reference voltage signal, wherein the first capacitive digital-to-analog-converter component is connected to the first sensor component and the second sensor component, wherein the second capacitive digital-to-analog-converter component is connected to the first sensor component and the second sensor component,
wherein the first sensor component and the second capacitive digital-to-analog-converter component are driven by the first reference voltage signal received from the sensor drive component, and wherein the second sensor component and the first capacitive digital-to-analog-converter component are driven by a second reference voltage signal received from the sensor drive component.

17. The device of claim 10, further comprising a differential sensor component, comprising the first sensor component and the second sensor component, wherein the reference voltage signal is a first reference voltage signal, wherein the first sensor component and the second sensor component are driven by the first reference voltage signal received from the sensor drive component, and wherein the first capacitive digital-to-analog-converter component and the second capacitive digital-to-analog-converter component are driven by a second reference voltage signal received from the sensor drive component.

18. A system, comprising:
at least one of a first sensor component or a second sensor component that sense or senses a condition, wherein at least the first sensor component is driven by a reference voltage signal received from a sensor drive component; and
a capacitive bridge component comprising a first capacitive digital-to-analog-converter component and a second capacitive digital-to-analog-converter component as a differential node, wherein the first capacitive digital-to-analog-converter component is associated with the first sensor component, and wherein the second capacitive digital-to-analog-converter component is associated with the second sensor component or a third capacitive digital-to-analog-converter component.

19. The system of claim 18, further comprising a capacitive feedback amplifier component, wherein the capacitive bridge component is connected to a differential input of the capacitive feedback amplifier component, and wherein a gain of the capacitive feedback amplifier component is programmable.

20. The system of claim 19, wherein the capacitive feedback amplifier component is a continuous amplifier, wherein no sampling is performed, and wherein noise is not folded back to at least one of the first sensor component or the second sensor component.

21. The system of claim 19, wherein the capacitive feedback amplifier component comprises a capacitively coupled input common mode feedback, wherein the capacitively coupled input common mode feedback sets an input common mode for the capacitive feedback amplifier component, and wherein the capacitively coupled input common mode feedback removes or suppresses noise from or associated with the sensor drive component.

22. The system of claim 21, wherein the capacitive feedback amplifier component comprises an output common mode feedback that generates a common mode voltage signal as an output based at least in part on at least one of a first capacitance of the first sensor component or a second capacitance of the second sensor component that is or are input to the capacitive feedback amplifier component, and wherein the common mode voltage signal is fed back to the bridge component.

23. The system of claim 19, further comprising a reset switch component associated with input nodes of the differential input of the capacitive feedback amplifier component, wherein the reset switch component is switched from an off state to an on state, based on a reset pulse, to facilitate resetting or adjusting a voltage level associated with the input nodes to a defined voltage level, wherein the result pulse is applied to the reset switch component at a defined reset pulse repetition rate or in response to determining that the voltage level associated with the input nodes satisfies a defined threshold voltage level that indicates a reset is to be performed.

24. The system of claim 18, wherein the reference voltage signal is a first reference voltage signal, wherein the first sensor component and the third capacitive digital-to-analog-converter component are driven by the first reference voltage signal received from a sensor drive component, and wherein the first capacitive digital-to-analog-converter component and the second capacitive digital-to-analog-converter component of the capacitive bridge component are driven by a second reference voltage signal received from the sensor drive component.

25. The system of claim 18, further comprising a balanced single sensor component, comprising the first sensor component and the second sensor component, wherein the reference voltage signal is a first reference voltage signal, wherein the first capacitive digital-to-analog-converter component is connected to the first sensor component and the second sensor component, wherein the second capacitive digital-to-analog-converter component is connected to the first sensor component and the second sensor component,
    wherein the first sensor component and the second capacitive digital-to-analog-converter component are driven by the first reference voltage signal received from the sensor drive component, and wherein the second sensor component and the first capacitive digital-to-analog-converter component are driven by a second reference voltage signal received from the sensor drive component.

26. The system of claim 18, further comprising a differential sensor component, comprising the first sensor component and the second sensor component, wherein the reference voltage signal is a first reference voltage signal, wherein the first sensor component and the second sensor component are driven by the first reference voltage signal received from the sensor drive component, and wherein the first capacitive digital-to-analog-converter component and the second capacitive digital-to-analog-converter component are driven by a second reference voltage signal received from the sensor drive component.

* * * * *